(12) United States Patent
Stewart et al.

(10) Patent No.: US 9,396,074 B2
(45) Date of Patent: Jul. 19, 2016

(54) VIRTUAL DATABASE REWIND

(71) Applicant: Delphix Corp., Menlo Park, CA (US)

(72) Inventors: Michael James Stewart, San Francisco, CA (US); Hubert Ken Sun, Menlo Park, CA (US)

(73) Assignee: Delphix Corp., Menlo Park, CA (US)

( * ) Notice: Subject to any disclaimer, the term of this patent is extended or adjusted under 35 U.S.C. 154(b) by 87 days.

(21) Appl. No.: 14/324,485

(22) Filed: Jul. 7, 2014

(65) Prior Publication Data

US 2015/0019496 A1 Jan. 15, 2015

Related U.S. Application Data

(63) Continuation of application No. PCT/US2014/044176, filed on Jun. 25, 2014.

(60) Provisional application No. 61/844,376, filed on Jul. 9, 2013.

(51) Int. Cl.
*G06F 17/30* (2006.01)
*G06F 11/14* (2006.01)

(52) U.S. Cl.
CPC .................................. *G06F 11/1464* (2013.01)

(58) Field of Classification Search
USPC .................. 707/600, 601, 609, 661, 790, 821
See application file for complete search history.

(56) References Cited

U.S. PATENT DOCUMENTS

| 5,819,292 | A | 10/1998 | Hitz et al. |
|---|---|---|---|
| 6,795,966 | B1 | 9/2004 | Lim et al. |
| 7,107,385 | B2 | 9/2006 | Rajan et al. |
| 7,120,862 | B1 * | 10/2006 | Ong .................. G06F 17/30864 707/999.003 |
| 7,225,204 | B2 | 5/2007 | Manley et al. |
| 7,334,094 | B2 | 2/2008 | Fair |
| 7,334,095 | B1 | 2/2008 | Fair et al. |
| 7,340,461 | B2 | 3/2008 | Vishlitzky et al. |
| 7,373,364 | B1 | 5/2008 | Chapman |
| 7,386,695 | B2 | 6/2008 | Fuente |
| 7,409,511 | B2 | 8/2008 | Edwards et al. |

(Continued)

FOREIGN PATENT DOCUMENTS

JP 2005532611 A 10/2005

OTHER PUBLICATIONS

Notice of Grounds for Rejection for Japanese Patent Application No. P2014-155597, Apr. 21, 2015, 5 Pages.

(Continued)

*Primary Examiner* — Sana Al Hashemi
(74) *Attorney, Agent, or Firm* — Fenwick & West LLP

(57) ABSTRACT

A database storage system allows users to modify the state of a virtual database. The database storage system provides a respective virtual database (VDB) at a respective destination, the respective VDB having a first timeflow stored in a respective container. A user can send a request to rewind a VDB. The request identifies timeflow of the VDB and a state of the VDB associated with a timeflow. The database storage system modifies the virtual database to refer to database blocks associated with a snapshot of the VDB associated with the identified timeflow. The database storage system maintains a new timeflow for the modified VDB. The database storage system also allows the virtual database to be refreshed to a state of a source database. The source database can be a database stored in an external system or a virtual database stored within the database storage system.

20 Claims, 19 Drawing Sheets

(56) References Cited

U.S. PATENT DOCUMENTS

| | | | |
|---|---|---|---|
| 7,457,982 B2 | 11/2008 | Rajan | |
| 7,539,836 B1 | 5/2009 | Klinkner | |
| 7,587,563 B1 | 9/2009 | Teterin et al. | |
| 7,590,660 B1 | 9/2009 | Richards et al. | |
| 7,631,021 B2 | 12/2009 | Sarma et al. | |
| 7,743,035 B2 | 6/2010 | Chen et al. | |
| 7,757,056 B1 | 7/2010 | Fair | |
| 7,822,758 B1 | 10/2010 | Prakash et al. | |
| 7,827,366 B1 | 11/2010 | Nadathur et al. | |
| 7,856,424 B2 | 12/2010 | Cisler et al. | |
| 7,877,357 B1 | 1/2011 | Wu et al. | |
| 7,937,547 B2 | 5/2011 | Liu et al. | |
| 7,941,470 B2 | 5/2011 | Le et al. | |
| 7,996,636 B1 | 8/2011 | Prakash et al. | |
| 8,037,032 B2 | 10/2011 | Pershin et al. | |
| 8,150,808 B2 | 4/2012 | Zha et al. | |
| 8,280,858 B2 | 10/2012 | Ahrens et al. | |
| 8,311,988 B2 | 11/2012 | Cisler et al. | |
| 8,532,973 B1 | 9/2013 | CaraDonna et al. | |
| 8,775,663 B1 | 7/2014 | Singh | |
| 2002/0083037 A1 | 6/2002 | Lewis et al. | |
| 2008/0092181 A1* | 4/2008 | Britt | H04N 7/1675 725/87 |
| 2008/0307345 A1 | 12/2008 | Hart et al. | |
| 2009/0222496 A1 | 9/2009 | Liu et al. | |
| 2011/0251992 A1* | 10/2011 | Bethlehem | H04L 12/2863 707/610 |
| 2011/0289289 A1 | 11/2011 | Leshinsky et al. | |
| 2012/0016839 A1 | 1/2012 | Yueh | |
| 2012/0084252 A1 | 4/2012 | Zha et al. | |
| 2014/0075004 A1* | 3/2014 | Van Dusen | H04L 41/04 709/223 |

OTHER PUBLICATIONS

Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages (With English Abstract).
Boppana, U., "Using FlexClone to Clone Files and LUNs," NetApp Technical Report, Mar. 2010, 32 Pages.
Creek, T., "Applications for Writeable LUNs and LUN Cloning in Oracle Environments," NetApp, Technical Report, Jun. 2003, 10 Pages.
Degwekar, A., "Using SnapMirror with SnapDrive for UNIX," NetApp Technical Report, 2007, 11 Pages.
Gmane, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.
Gmane, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.
Gmane, Discussion regarding "ZFS snapshot improvement," From the zfs-discuss@opensolaris.org mailing list, May 10, 2006, 1 Page, Can be retrieved <URL:http://article.gmane.org/gmane.os.solaris.openolaris.zfs/232/match=snapshot>.
Gmane, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.
Higgins, B., et al., "Backup and Recovery Snap Manager for SQL Server," DLA PIPER, Nov. 2008, 37 Pages.
Hitz, D., et al., "File System Design for an NFS File Server Appliance," Technical Report, USENIX, Winter 1994, 23 Pages.
Jackson, J., "ZFS: The future for storage networks?; File system has massive capacity, but licensing issues and architectural concerns persist," Government Computer News, Media, Inc., Jun. 25, 2007, 2 Pages.
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Lal, J., et al., "DB2: Cloning a Database using NetApp FlexClone Technology," NetApp, Apr. 30, 2006, 60 Pages.
Merrill, J., et al., "SnapVault Best Pratices Guide," NetApp Technical Report, 2008, 29 Pages.
Nadgir, N., "Databases and ZFS," Oracle Blog, Sep. 25, 2006, 8 Pages, Can be retrieved from <URL:https://blog.oracle.com/realneel/entry/zfs_and_databases>.
Network Appliance, Inc., "Data Ontap 7.2 Commands: Manual Page Reference, vol. 1," May 16, 2008, 615 Pages.
Network Appliance, Inc., "NetApp Data Management for Decision Support Systems," 2005-2010, 4 Pages.
Network Appliance, Inc., "Flexvol and Flexclone Software," 2006, 2 Pages.
Network Appliance, Inc., "SnapManager 3.0 for Oracle Installation and Administration Guide," Nov. 2008, 294 Pages.
Network Appliance, Inc., "SnapManager 2.2 for Oracle Installation and Administration Guide," Nov. 2007, 310 Pages.
Network Appliance, Inc., "SnapManager 5.0 for Microsoft SQL Server Installation and Administration Guide," Oct. 2008, 492 Pages.
Network Appliance, Inc., "Network Appliance Snapmirror Software," 2006, 2 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Using IBM DB2 UDB with IBM System Storage N series" Redbooks, IBM, Dec. 2006, 136 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Syncsort, White Paper, 2007, 12 Pages.
Syncsort Incorporated, "Syncsort Backup Express Advanced Recovery for NetApp," Syncsort, 2008, 12 Pages.

(56) References Cited

OTHER PUBLICATIONS

Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," Paul'S Blog 3.0 (Release Candidate), Oracle, 2007, 5 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
Netapp, 2007 NetApp, Inc., Data Ontap 7.1 Data Protection Online Backup and Recovery Guide, NetApp Technical Doc, Jan. 12, 2007, pp. 508.
Netapp, "Datasheet FlexClone," NetApp Technical Doc, 2008, 2 Pages.
Netapp, "Datasheet FlexVol™ and FlexClone™ Software," NetApp Technical Doc, 2004, 2 Pages.
Netapp, "Datasheet Netapp SnapManager for Oracle," NetApp Technical Doc, 2008, 2 Pages.
Netapp, "Datasheet NetApp SnapMirror," NetApp Technical Doc, 2008, 2 Pages.
Netapp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
PCT International Search Report and Written Opinion, PCT Application No. PCT/US14/44176, Oct. 14, 2014, 18 Pages.
Sadagopan, P., et al., "Oracle Fusion Middleware DR Solution Using NetApp Storage," NetApp Technical Report, May 2008, 38 Pages.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-000261, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, IPR2015-00108, U.S. Pat. No. 8,566,361 B2, May 1, 2016, 57 Pages.

\* cited by examiner

VIRTUAL DATABASE REWIND

CROSS REFERENCES TO RELATED APPLICATIONS

This application claims the benefit of U.S. Provisional Patent Application No. 61/844,376 filed Jul. 9, 2013, which is incorporated by reference in its entirety. This application is also a continuation of PCT Application No. PCT/US14/44176, filed on Jun. 25, 2014, which claims the benefit of U.S. Provisional Patent Application No. 61/844,376 filed Jul. 9, 2013, each of which is incorporated by reference in its entirety.

BACKGROUND

1. Field of Art

This invention relates generally to databases and in particular to storage efficient systems for managing databases.

2. Description of Related Art

Databases store the data that is critical to an organization and thus form an important part of an organization's information technology infrastructure. Database software is often complex and requires experts, for example, database administrators for maintaining the database software. Furthermore, databases store large amount of information. As a result, conventional techniques for performing several database operations are very slow. For example, for purposes of development and testing, developers and/or testers need a copy of a database as it existed at a particular point in time. Providing such database may only be possible if an appropriate backup of the database was taken at that point in time. Assuming the appropriate backup was taken, a database administrator is often required to take appropriate steps to restore the database to the required state. Furthermore, the restore operation can take a long time. The overall delay in interacting with the database administrator and getting the database restored can be significant. As a result, developers and/or testers have to wait for the appropriate test/development database to be available. These delays can be costly for the enterprise as various personnel wait for the appropriate environment to become available. Furthermore, delays in the development and testing process cause further delay in fixing of the problem, resulting in loss of productivity. As a result, conventional techniques for providing a copy of a database corresponding to a particular state are often inadequate.

SUMMARY

Embodiments perform a rewind operation on a virtual database (VDB) by modifying the state of the VDB to another state of the VDB. A database storage system stores snapshots of a source database representing a point-in-time copies of database blocks of the source database such that one or more database blocks are shared across the snapshots. The database storage system provisions a virtual database based on database blocks of a snapshot of the source database. The database storage system maintains timeflows for the virtual database such that a timeflow comprises representations of changes to the virtual database starting from an initial state. The representations of changes to the virtual database comprise snapshots of the virtual database taken at different points in time such that one or more database blocks are shared across snapshots of the virtual database. The database storage system receives a request to rewind the virtual database to a previous state of the virtual database. The request identifies a timeflow of the virtual database and a target point in time associated with the identified timeflow. The database storage system rewinds the virtual database by modifying the virtual database to refer to database blocks of a snapshot of the virtual database associated with the timeflow. The database storage system maintain a new timeflow for the rewound virtual database, the new timeflow representing changes caused by subsequent updates to the rewound virtual database Embodiments perform refresh operation on a VDB to modify the state of the VDB to a state of a source database associated with the VDB. The database storage system maintains timeflows for a source database, each timeflow comprising representations of changes to the source database starting from an initial state of the source database. The representations of changes comprise snapshots of the source database taken at different points in time. The database storage system provisions a virtual database based on database blocks of a snapshot of the source database. The database storage system maintains timeflows for the virtual database. The database storage system receives a request to refresh the virtual database to a state of the source database identified by a timeflow of the source database and a target point in time of the timeflow. The database storage system refreshes the virtual database by modifying the virtual database to refer to database blocks of a snapshot of the source database associated with the identified timeflow. The database storage system maintains a new timeflow for the refreshed virtual database representing changes caused by subsequent updates to the refreshed virtual database.

The features and advantages described in this summary and the following detailed description are not all-inclusive. Many additional features and advantages will be apparent to one of ordinary skill in the art in view of the drawings, specification, and claims hereof.

Figure 1:
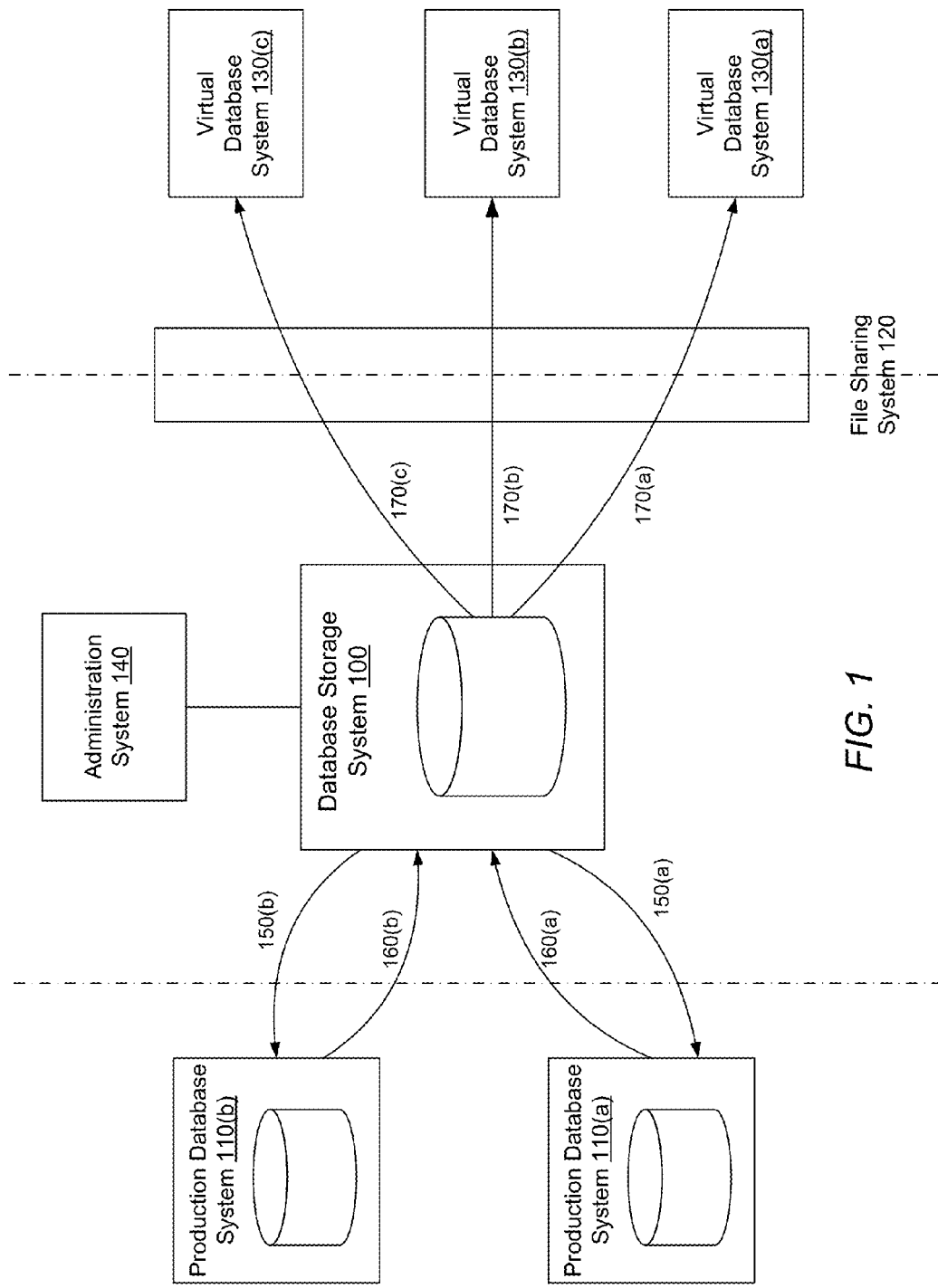
FIG. 1 is diagram illustrating how information is copied from a production database to a database storage system and provisioned as virtual databases using a file sharing system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Furthermore, the above-mentioned approach to remote provisioning allows historical changes, updates or modifications to source database blocks (e.g., database blocks in a production database) to be saved across time in a storage and performance efficient manner as VDB snapshots captured at various time points. These historical changes to the source database saved as snapshots of the VDB are optionally replicated across the one or more remote target (e.g., development) environments, allowing a user to revert to or retrieve a copy of the VDB from a previous point in time at the target. This process of reverting to a copy of a VDB at a prior time point is referred to as rolling back or rewinding of the VDB.

Some approaches to rewinding a VDB include creating a new virtual database from the user-specified prior time point (e.g., by accessing the snapshots of the VDB stored in the database storage system) and allowing the user to access and make changes to the new VDB. A problem encountered with this approach to rewinding a VDB is that the creation of a new VDB with a new logical identity (e.g., a new name, new identifier, and new copy of all VDB files and associated configuration files), distinct from the logical identity of the original VDB, results in storage and performance inefficiency.

Accordingly, some embodiments provide a method of rewinding or rolling back a database that does not require creation of a new VDB at the user-specified prior time point, but rather a creation of a new timeflow associated with the original VDB (in the same container or database storage system as the previous VDB timeflow). This approach results in a faster and more storage efficient VDB rewind operation as compared to the approach involving the creation of a new VDB from the rewind point.

Virtual Database Systems

In certain embodiments of the invention, one or more virtual databases are created based on the state of a production database or a virtual database at a particular point in time. The virtual databases can then be individually accessed and modified as desired. A database comprises data stored in a computer for use by computer implemented applications. A database server is a computer program that can interact with the database and provides database services, for example, access to the data stored in the database. Embodiments create a virtual database using storage level snapshots of production databases or clones of production databases instead of a live production database. Virtual database systems are described in U.S. patent application Ser. No. 12/603,541 filed on Oct. 21, 2009, now issued as U.S. Pat. No. 8,150,808, which is incorporated by reference herein in its entirety.

In one embodiment, information from the production database is copied to a storage system at various times, such as periodically. This enables reconstruction of the database files associated with the production database for these different points in time. The information may be managed in the storage system in an efficient manner so that copies of information are made only if necessary. For example, if a portion of the database is unchanged from a version that was previously copied, that unchanged portion need not be copied. A virtual database created for a point in time is stored as a set of files that contain the information of the database as available at that point in time. Each file includes a set of data blocks and the data structures for referring to the data blocks.

A virtual database may be created on a database server by creating the database files for the production database corresponding to the state of the production database at a previous point in time, as required for the database server. The files corresponding to the virtual database are made available to the database server using a file sharing mechanism, which links the virtual database to the appropriate data blocks stored on the storage system. The process of making the virtual database available to a database server is called "provisioning" the virtual database. Multiple VDBs can be provisioned based on the state of the production database at the same point in time. On the other hand, different VDBs can be based on different point in time state of the same production database or different production databases. VDBs may also be based on other VDBs.

The database server on which a virtual database has been provisioned can read from and write to the files stored on the storage system. A database block may be shared between different files, each file associated with a different VDB. In particular, a database block is shared if the corresponding virtual database systems 130 are only reading the information in the database block and not writing to the database block. In one embodiment, the virtual database manager 375 makes copies of the database blocks only if necessary. For example, a particular database block may be shared by multiple VDBs that read from the same database block. But if one of virtual database systems 130 attempts to write to the database block, a separate copy of the database block is made because the writing operation causes that database block to be different for the VDB corresponding to that virtual database systems 130 than it is for the other VDBs.

FIG. 1 illustrates one embodiment for how information may be copied from a production database to a database storage system and provisioned as virtual databases using a file sharing system. The database storage system 100 retrieves data associated with databases from one or more production database systems 110 and stores the data in an efficient manner, further described below. A database administrator user interface 140 allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The database storage system 100 receives the data 160 sent by the production database system 110 and stores the data. The database storage system 100 stores the information efficiently, for example, by keeping versions of database blocks that have changed and reusing database blocks that have not changed.

To create a virtual database, the database storage system 100 creates files that represent the information corresponding to the production database system 110 at a given point in time.

The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

Figure 2:
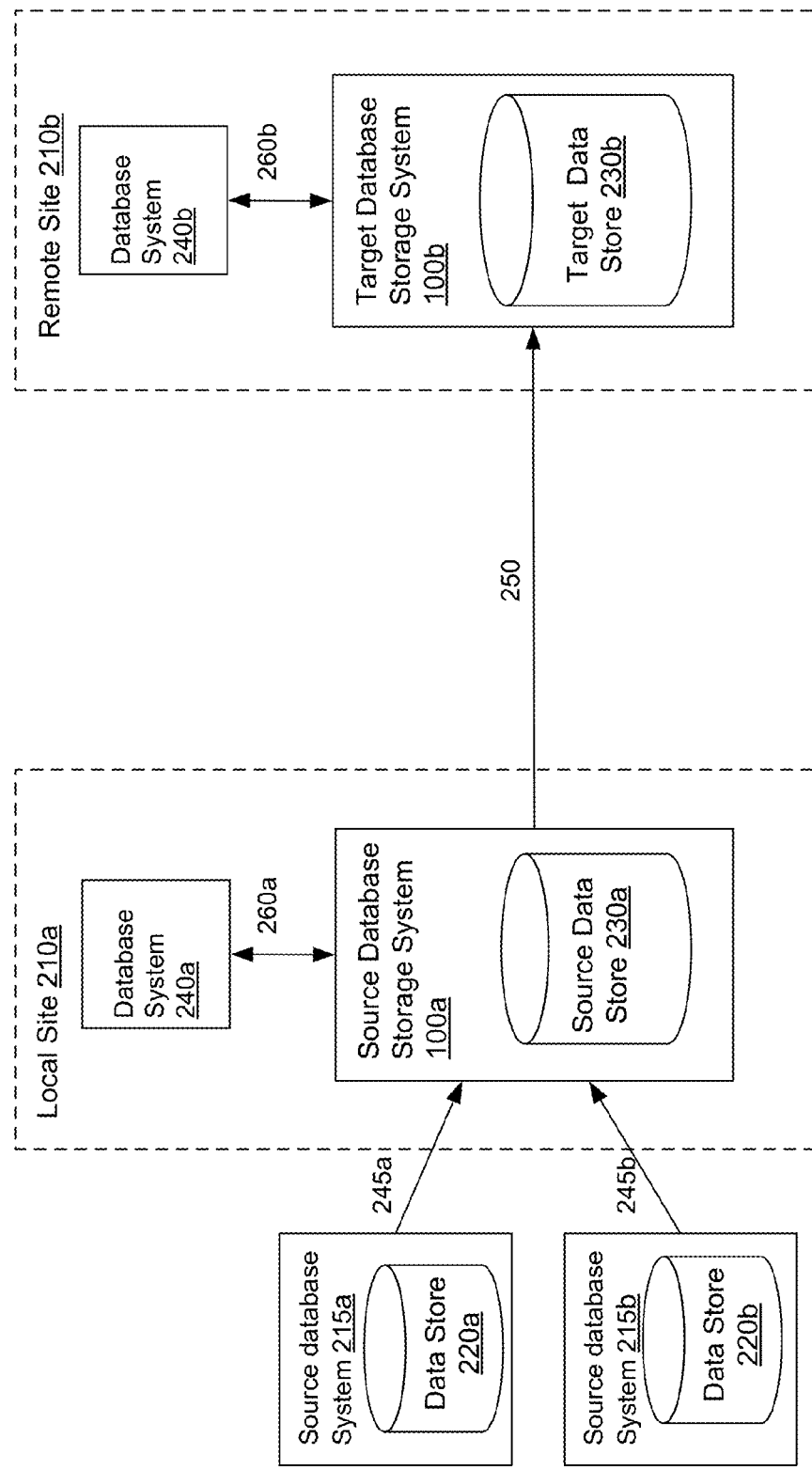
FIG. 2 illustrates the overall system environment that allows remote provisioning of virtual databases according to an embodiment.

VDBs can be used in various workflow scenarios. FIG. 2 illustrates an example workflow scenario showing remote provisioning of virtual databases according to an embodiment. There are two sites that store database storage systems. The local site 210a comprises the source database storage system 230a and the remote site 210b comprises the target database storage system 230b. There may be one or more source database systems 215 that include data stores 220. The source database system 215a includes data store 220a and the source database system 215b includes the data store 220b. The changes to the data stores 220 of the source database systems 215 are periodically received 245 by the source storage database system 100a and stored in the source data store 230a. A database system 240a may create virtual databases in the source database storage system 100a and read/write 260a to the VDB.

Information describing changes to data in the source database storage system 100a is transmitted 250 to the target storage database system 100b. These comprise the changed data blocks since the last time the data was transmitted from the source database storage system 100a is transmitted 250 to the target storage database system 100b. The changes to the data in the source database storage system 100a may be transmitted 250 periodically or based on a predetermined schedule. A database system 240b creates virtual databases in the target database storage system 100b. The database system 240b is allowed to read/write 260b to the VDB.

System Architecture

Figure 3:
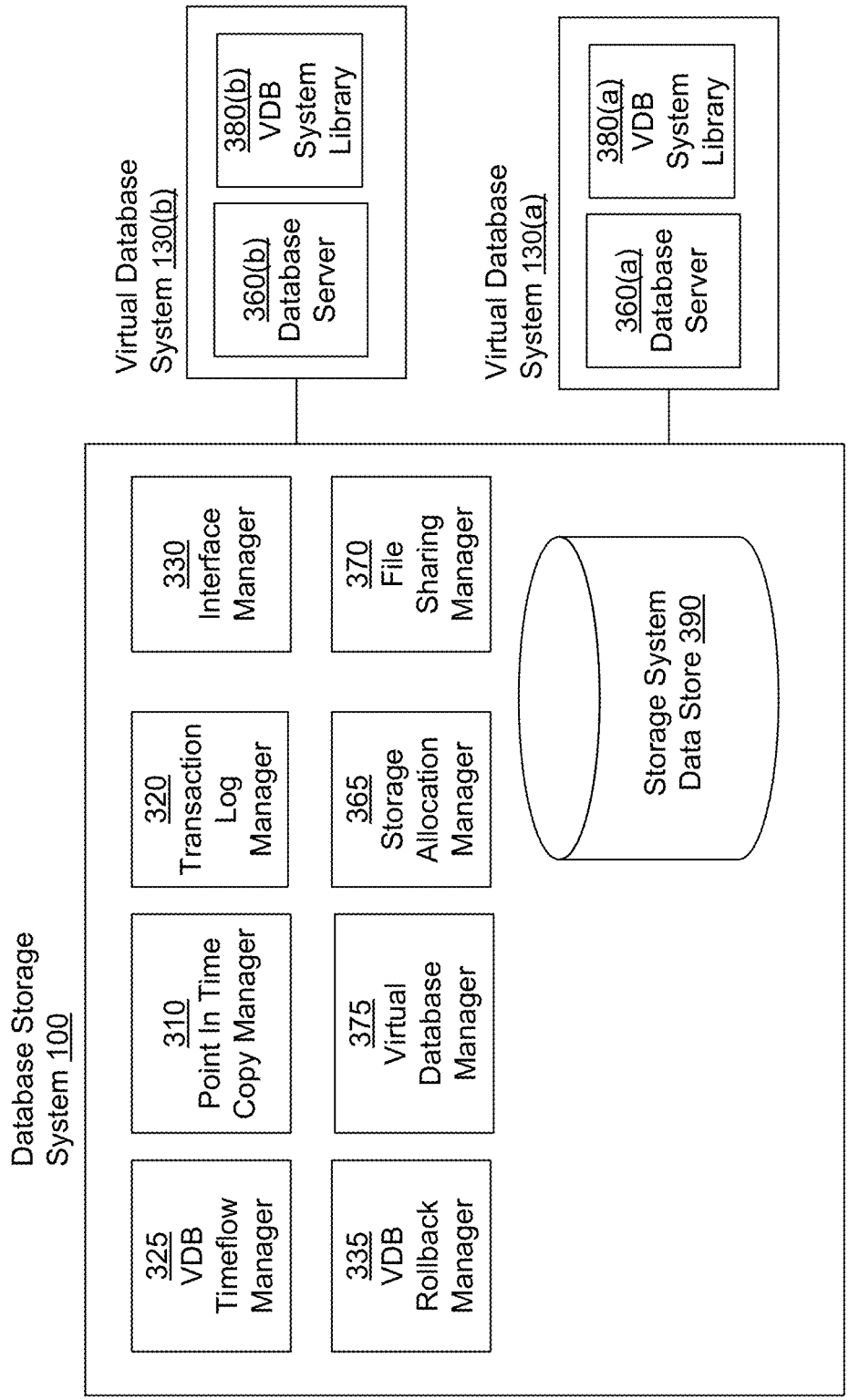
FIG. 3 is a diagram of the architecture of a system that makes storage efficient copies of information from a production database and provisions virtual databases, in accordance with some embodiments.

FIG. 3 shows a high level block diagram illustrating a system environment suitable for making storage efficient copies of information from a production database and provisioning one or more virtual databases using that information. The system environment comprises a database storage system 100, and one or more virtual database systems 130. Systems shown in FIG. 3 can communicate with each other if necessary via a network. FIG. 3 does not illustrate other systems that may be used for example, a production database system 110 or an administration system 140.

The database storage system 100 retrieves information available in the production database systems 110 and stores it. The information retrieved includes database blocks comprising data stored in the database, transaction log information, metadata information related to the database, information related to users of the database and the like. The information retrieved may also include configuration files associated with the databases. For example, databases may use vendor specific configuration files to specify various configuration parameters including initialization parameters associated with the databases.

The data stored in the storage system data store 390 can be exposed to a virtual database system 130 allowing the virtual database system 130 to treat the data as a copy of the production database stored in the production database system 110. The database storage system 100 includes a point-in-time copy manager 310, a transaction log manager 320, an interface manager 330, a storage allocation manager 365, a file sharing manager 370, a virtual database manager 375, a VDB time-flow manager 325, a VDB rollback manager 335, and a storage system data store 390. In alternative configurations, different and/or additional modules can be included in the database storage system 100.

The point-in-time copy manager 310 interacts with the production database system 110 by sending a request to the vendor interface module 335 to retrieve information representing a point-in-time copy (also referred to as a "PIT copy") of a database stored in the production DB data store 350. The point-in-time copy manager 310 stores the data obtained from the production database system 110 in the storage system data store 390. The data retrieved by the point-in-time copy manager 310 corresponds to database blocks (or pages) of the database being copied from the production DB data store 350. After a first PIT copy request to retrieve information production DB data store 350, a subsequent PIT copy request may need to retrieve only the data that changed in the database since the previous request. The data collected in the first request can be combined with the data collected in a second request to reconstruct a copy of the database corresponding to a point in time at which the data was retrieved from the production DB data store 350 for the second request.

The transaction log manager 320 sends request to the production database system 110 for retrieving portions of the transaction logs stored in the production database system 110. In some embodiments, the request from the transaction log manager 320 is sent to the vendor interface module 335. The data obtained by the transaction log manager 320 from the vendor interface module 335 is stored in the storage system data store 390. In one embodiment, a request for transaction logs retrieves only the changes in the transaction logs in the production database system 110 since a previous request for the transaction logs was processed. The database blocks retrieved by a point in time copy manager 310 combined with the transaction logs retrieved by the transaction log manager 320 can be used to reconstruct a copy of a database in the production system 110 corresponding to times in the past in between the times as which point-in-time copies are made.

The storage allocation manager 365 provides the functionality of saving data retrieved from the production database system 110. For example, the point-in-time copy manager 310 may call APIs of storage allocation manager to save blocks of data retrieved from the production database system 110. The storage allocation manager 365 keeps track of the various versions of each block of data that may be obtained from the production database system 110. For a given time point, the storage allocation manager 365 can be requested to provide the latest version of a block of data obtained before the given time point. The storage allocation manager 365 can also be used for making copies of blocks of data. If a block of data is copied for read-only purposes, the storage allocation manager 365 allocates only sufficient storage to keep a pointer of reference to the exiting block of data. However, if an attempt to write to the copied block of data is made, the storage allocation manager 365 allocates sufficient storage to make an actual copy of the block of data to avoid updating the original block of data.

The file sharing manager 370 allows files stored in the storage system data store 390 to be shared across computers that may be connected with the database storage system 100 over the network. The file sharing manager 370 uses the file sharing system 120 for sharing files. An example of a system for sharing files is a network file system (NFS). A system for sharing files may utilize fiber channel Storage area networks (FC-SAN) or network attached storage (NAS) or combinations and variations thereof. The system for sharing files may be based on small computer system interface (SCSI) protocol, internet small computer system interface (iSCSI) protocol, fiber channel protocols or other similar and related protocols. In some embodiments, the database storage system 100 may utilize a logical volume manager. Sharing a file stored in the storage system data store 390 using the file sharing manager 370 allows a remote computer, for example, the virtual database systems 130 to access the data in the shared file. A remote system may be able to read and write from/to the file shared by the storage system data store 390. In an embodiment, files are organized in a format emulating a given file system disk layout, such as the file system of WINDOWS operating system called NTFS or the UNIX file system (UFS).

The virtual database manager 375 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 375 creates the necessary files corresponding to the virtual database being created and shares the files with the virtual database system 130. The database administrator for a virtual database system 130 may be different from a database administrator for the production database system 110.

A VDB timeflow manager 325 maintains storage, update, and retrieval of information associated with one or more timeflows corresponding to the virtual database. The VDB timeflow manager 325 stores information describing one or more time points along the timeflows, sequence change numbers and transaction logs associated with updates or modifications to the VDB files, snapshots of the files at a subset of the time points along the timeflows, and the like. According to an embodiment, a representation of a timeflow stores information describing changes performed on a source database or a VDB. In an embodiment, the changes are stored in a storage efficient manner. For example, at various point-in-time copies (or snapshots) of the data of the source database or VDB is stored such that one or more database blocks are shared across the point-in-time copies. In particular, database blocks that do not change are shared across two consecutive point-in-time copies and database blocks that are updated are copied before the updates are made. In an embodiment, the information describing the changes also comprises transaction logs representing changes made in the time duration between capturing of two point-in-time copies.

A VDB rollback manager 335 receives user requests to rewind or rollback a VDB to a user-specified point along a timeflow. The VDB rollback manager 335 interfaces with the VDB timeflow manager 325 to access timeflow information corresponding to the virtual database so as to retrieve a representation of the virtual database at the user-specified point in time.

A virtual database system 130 includes a database server 360 and a VDB system library 380. The database server 360 is similar in functionality to the database server 345 and is a computer program that provides database services and application programming interfaces (APIs) for managing data stored on a data store 350. The data managed by the database server 360 may be stored on the storage system data store 390 that is shared by the database storage system 100 using a file sharing system 120. The VDB system library 380 contains program code for processing requests sent by the database storage system 100. In alternative configurations, different and/or additional modules can be included in a virtual database system 130.

Figure 4A:
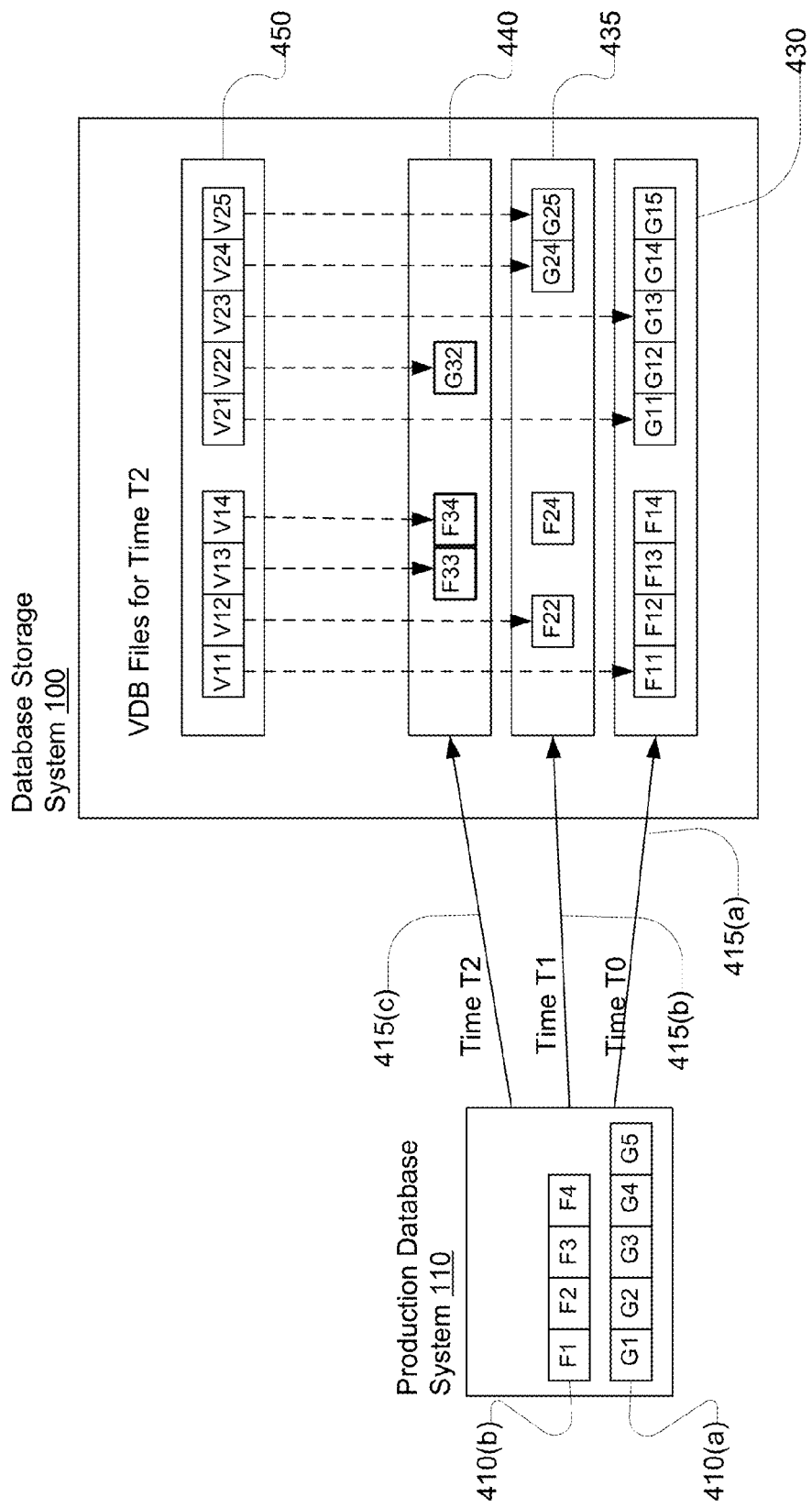
FIG. 4a illustrates a structure of data stored in a virtual database according to some embodiments.

Creation of Point-in-Time Copies (Referred to Herein as Snapshots) of a Virtual Database FIG. 4a indicates how storage efficient copies are made to create a read/write file structure representing a VDB. As shown in FIG. 4, the structures 410 represent the files corresponding to a database on the production database system 110. The structures Fi and Gi represent database blocks stored in the files 410 respectively (Fi refers to F1, F2, F3, . . . and similarly Gi refers to G1, G2, G3, . . . ). The arrows 415 represent the process of making PIT copies at different time points Ti. The first PIT copy 430 made at time T0 needs to copy all the necessary database blocks of the database. For example, F1i represents a copy of block Fi and block G1i represents a copy of block Gi. The PIT copy 435 made at time T1 copies only the blocks that changed since the last PIT copy and may copy much less data compared to the first PIT copy. Similarly at time T2 another PIT copy 440 is made copying the database blocks that changed since the previous PIT copy 435.

Assuming the PIT copy 440 is the last PIT copy made for the configuration shown in FIG. 4, the VDB file structures 450 are created for time point T2. When the structure 450 are created, the blocks V11, V12, . . . , V25 may be implemented as pointers to the actual database block that stores the data. For example, V11 represents the information in block F1 and since the block F1 was never updated during copies made at time T1 and T2, V11 points at F11. V12 represents the information in block F2 and since F2 was updated at time T1, V12 points at the block F22. Similarly, V13 corresponds to block F3 that was updated at time T2 and points at the block F33.

Since the structure 450 illustrated in FIG. 4 is a read/write structures, the virtual database system 130 is allowed to read from these structures as well as write to them. When the virtual database system 130 writes to a block Vij, space is allocated for the database block and the data of the corresponding database block copied to the space allocated. For example, if the virtual database system 130 writes to the block V11, space is allocated and block F11 copied to the allocated block. Hence the original copy of the block F11 is maintained as a read only copy and the virtual database system 130 is allowed to write to a copy of the appropriate database block created specifically for the virtual database system 130. This can be considered a lazy mechanism for creating copies of the database blocks that copies a database blocks only if the corresponding virtual database system 130 writes to the database block. Since the number of blocks that a virtual database system 130 writes to may be a small fraction of the total number of blocks associated with the VDB, the above structure stores the data associated with the VDB in a highly storage efficient manner. A database block that is not written to by virtual database systems 130 may be shared by several virtual database systems without being copied for specific virtual database systems 130.

Figure 4B:
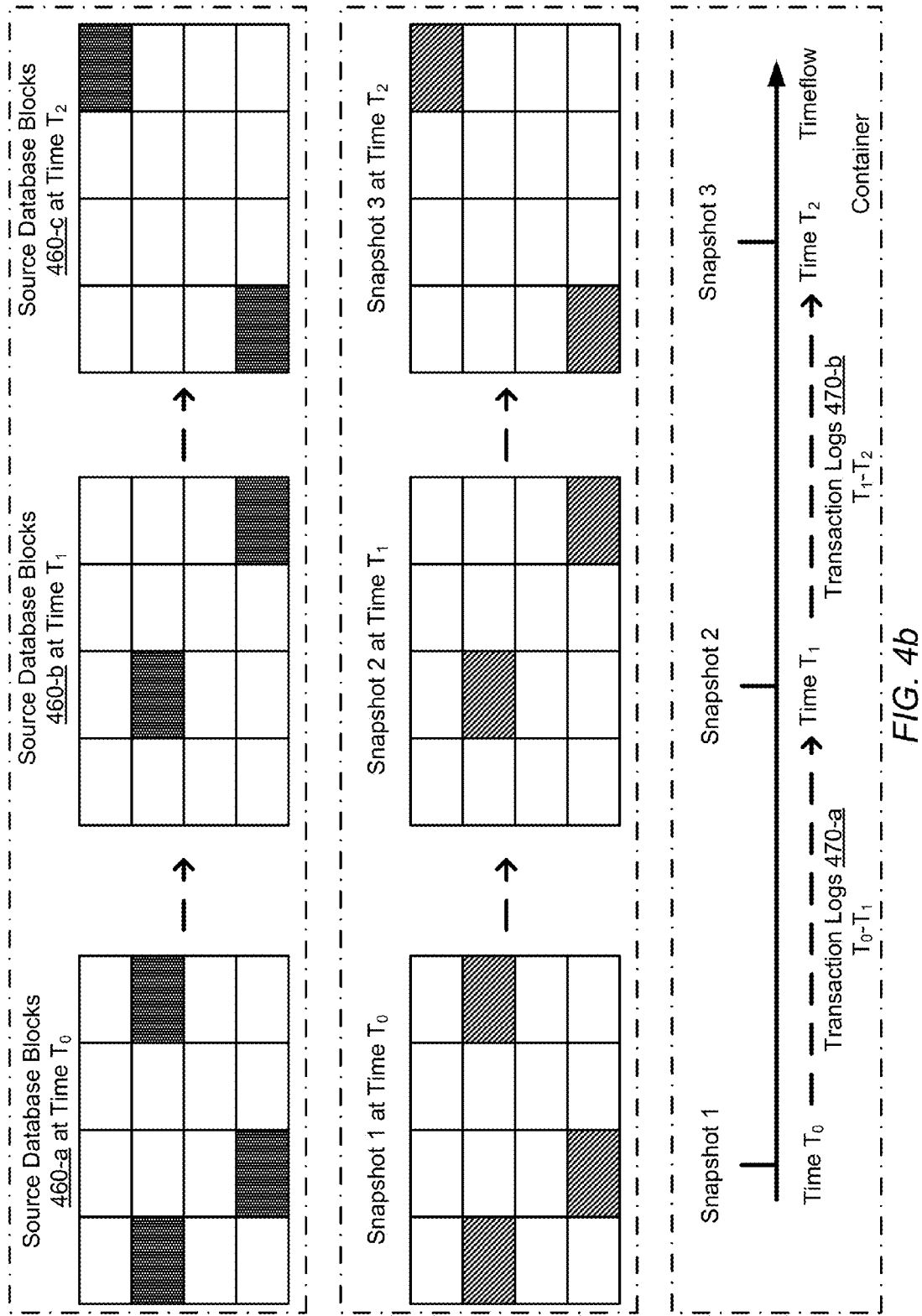
FIG. 4b illustrates a process of capturing snapshots of a virtual database, corresponding to changes in a source database, at various time points along a timeflow, according to some embodiments.

As another illustration of creation of point-in-time copies (or snapshots) of a virtual database, FIG. 4b illustrates a process of capturing snapshots of a virtual database (at various time points along a time line or timeflow), corresponding to changes in the source database, according to some embodiments.

Shown in FIG. 4b is a time progression along a time line showing changes in database blocks based on a source database (e.g., production database 110, as explained with reference to FIG. 4a) and corresponding changes in the snapshots captured at one or more time points along the timeflow. As explained above with reference to FIG. 4a, changes or updates in specific blocks of the source database result in changes in the corresponding database blocks stored in the database storage system 100. Conversely, database blocks stored in the database storage system 100 corresponding to database blocks of the source database that are not updated or modified are themselves not modified or updated.

Accordingly, as shown in the timeflow in FIG. 4b, a snapshot (e.g., snapshot 1) is captured at time $T_0$. At time $T_0$ or prior to time $T_0$ (e.g., subsequent to the capture of the immediately prior snapshot), the highlighted source database blocks (e.g., in the illustration of source database blocks 460-a) are updated or modified. Consequently, the database storage system receives the modified source database blocks and stores them (as shown in FIG. 4b); snapshot 1 captured at time $T_0$ therefore reflects the changes corresponding to source database changes that occurred after capture of a snapshot immediately prior to snapshot 1.

Subsequently, as shown in the timeflow in FIG. 4b, snapshot 2 is captured at time $T_1$. Source database blocks that are updated or modified between time $T_0$ and time $T_1$ are as highlighted (e.g., in the illustration of source database blocks 460-b); the database storage system 100 receives and stores database blocks corresponding to the modified source database blocks as reflected in snapshot 2 captured at time $T_1$.

The modifications to the VDB that occur between time $T_0$ and time $T_1$ are reflected in the transaction logs 470-a between time $T_0$ and time $T_1$. As explained above with reference to FIG. 3, the transaction logs can be used to reconstruct a copy of the source database corresponding to time points between the times at which snapshots are captured (e.g., in this example, between time $T_0$ and time $T_1$).

Furthermore, along the timeflow shown in FIG. 4b, snapshot 2 is captured at time $T_1$. Source database blocks that are updated or modified between time $T_1$ and time $T_2$ are as highlighted (e.g., in the illustration of source database blocks 460-c); VDB files corresponding to the modified source database blocks are updated or modified, and reflected in VDB snapshot 3 captured at time $T_2$. The modifications to the VDB that occur between time $T_1$ and time $T_2$ are reflected in the transaction logs 470-b between time $T_0$ and time $T_1$, which can be used to reconstruct a copy of the source database corresponding to time points between time $T_1$ and time $T_2$.

As a result, historical changes, updates or modifications to source database blocks (e.g., database blocks in a production database) can be monitored and saved across time in a storage and performance efficient manner, and these changes replicated across remote target (e.g., development) environments. The timeflow is also used to represent changes made to a virtual database.

Rewind or Rollback of a Virtual Database

Figure 5A:
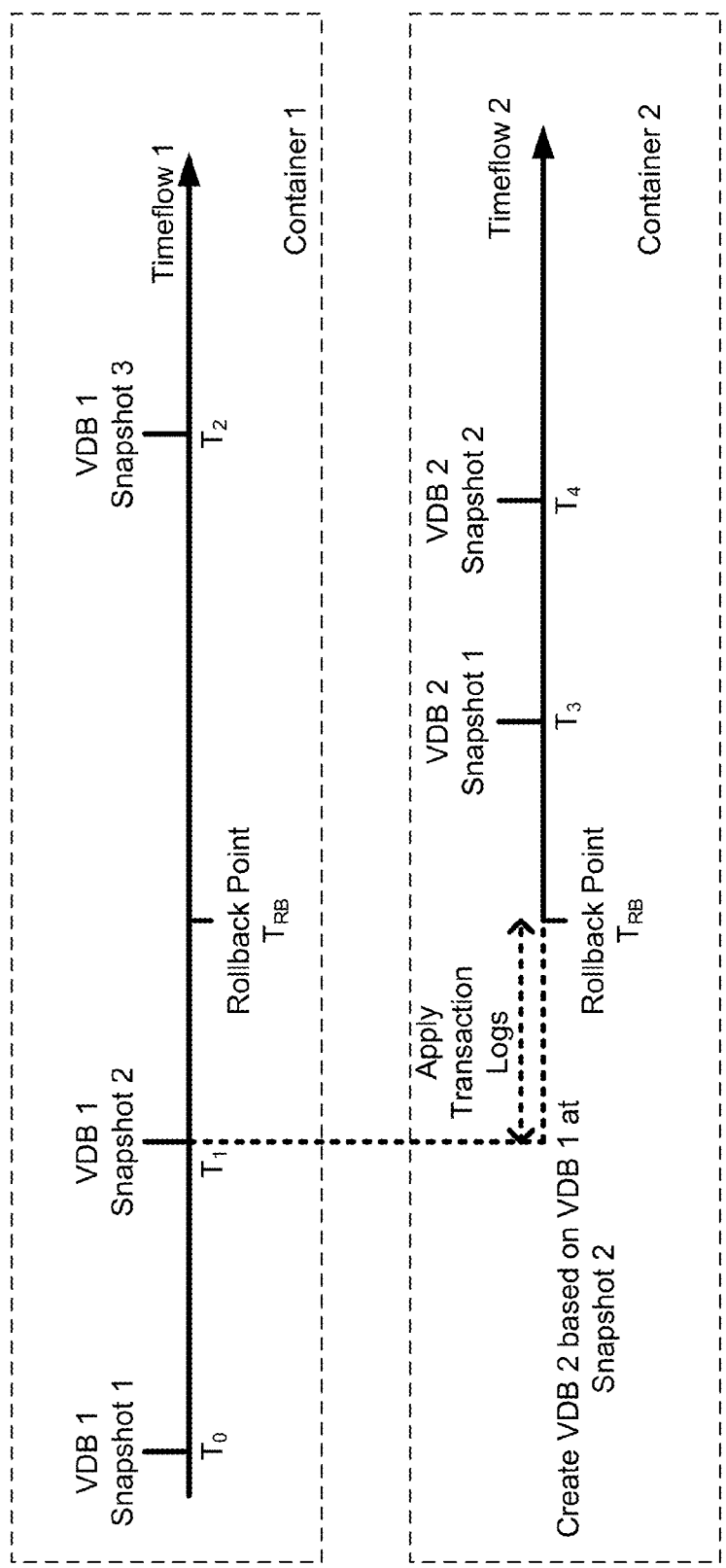
FIG. 5a illustrates a first approach to rewinding a virtual database to a user-specified time point, according to some embodiments.

FIG. 5a illustrates an approach to rewinding a virtual database to a user-specified time point, according to an embodiment. As shown in FIG. 5a, a virtual database (e.g., VDB 1) undergoes modifications or updates based on updates to its source database (as explained with reference to FIGS. 4a-4b) at points in time along a timeflow (e.g., timeflow 1) associated with the virtual database. As described with reference to FIGS. 4a-4b, snapshots of the virtual database and changes to the virtual database (corresponding to changes in the associated source database) are captured and stored at a subset of time points (e.g., $T_0$, $T_1$, and $T_2$) along timeflow 1. In some embodiments, the timeflow representing changes to the virtual database, e.g., snapshots associated with the virtual database and transaction logs are stored in a virtual database container (e.g., container 1 shown in FIG. 5a).

In some embodiments, a container stores a representation of a database in the database storage system, for example, a VDB or a dSource representing a source database. A container may include one or more timeflows associated with the VDB or dSource. Accordingly, the container represents snapshots, transaction logs, and metadata associated with a VDB or dSource. In some embodiments, a timeflow represents changes to a data source (e.g., a source database stored in an external system or another VDB) over a period of time (e.g., by storing snapshots and changes in between snapshots using transaction logs). In some embodiments, since a VDB can go back in time (e.g., rewind the VDB to change its state to a previous state of the VDB) or move forward in time (e.g., modify the state of the VDB to a more recent state along a timeflow compared to the state used for rewinding the VDB; alternatively refresh so as to update the VDB state to a more recent state corresponding to a source database), multiple timeflows are stored in the container. Each timeflow is associated with an initial state of the VDB and representations of changes made to the VDB after the VDB state was updated to the initial state.

Illustrated in FIG. 5a is a first approach to rewinding a VDB, according to some embodiments. Responsive to a user request to rollback or rewind the virtual database to a point in time (e.g., to rollback point $T_{RB}$ shown in FIG. 5a) prior to a current time point, according to the first approach, the database storage system simulates a VDB rollback by creating a new VDB (e.g., VDB 2), distinct from the original VDB (e.g., distinct from VDB 1) based on the original VDB at the desired rollback point. In other words, in the example shown in FIG. 5a, rollback of the virtual database is simulated by creating VDB 2, distinct from VDB 1, at rollback point $T_{RB}$ based on VDB 1 at $T_{RB}$. In the event that a snapshot of VDB 1 exists at the rollback point, VDB 2 is created based on the snapshot of VDB 1 at $T_{RB}$. On the other, if a snapshot of VDB 1 does not exist at rollback point $T_{RB}$ (e.g., as shown in FIG. 5a), VDB 2 is created based on a snapshot of VDB 1 immediately prior to the rollback point (e.g., VDB 1 snapshot 2 at $T_1$) by applying interim transaction logs (e.g., between $T_1$ and $T_{RB}$) to recreate VDB 1 at the rollback point.

Toward this end, in some embodiments, the first approach of rolling back the virtual database includes creating a new VDB container (e.g., container 2), creating a new VDB based on the previous VDB at a nearest prior snapshot (e.g., creating VDB 2 based on VDB 1 at snapshot 2), and creating a new timeflow (e.g., timeflow 2) originating at the rollback point (e.g., starting at $T_{RB}$). In such embodiments, the new VDB (e.g., VDB 2) has a new logical identity (e.g., a new name, new identifier, and new copy of all VDB files and associated configuration files), distinct from the logical identity of the original VDB (e.g., VDB 1).

Figure 5B:
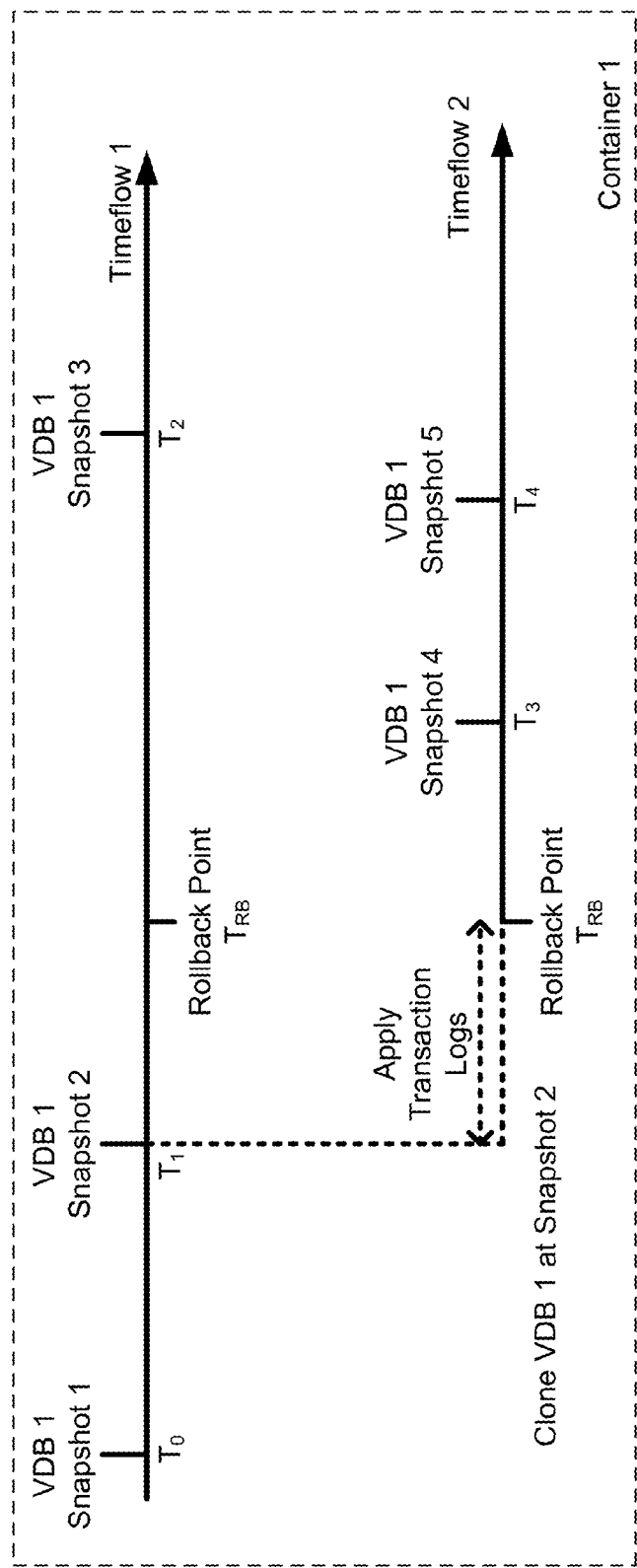
FIG. 5b illustrates a second approach to rewinding a virtual database to a user-specified time point, according to some embodiments.

FIG. 5b illustrates another approach to rewinding a virtual database to a user-specified time point, according to an embodiment. This approach to rewinding the database involves updating the state of the current VDB to a state of the VDB that occurred at a previous time point. Accordingly, the container of the VDB is modified to change the state of the VDB, thereby eliminating the need to create a new VDB with a new logical identity. The state of the VDB is changed by modifying the structures representing the VDB to point at database blocks corresponding to the previous points in time. Accordingly, in some embodiments, the second approach to rewinding a VDB (e.g., described below with reference to FIG. 5b) provides a more storage and time efficient approach to rewinding a virtual database compared to the first approach (e.g., described with reference to FIG. 5a).

In some embodiments, as shown in FIG. 5b, a virtual database (e.g., VDB 1) undergoes modifications or updates based on updates to its source database at points in time along a timeflow (e.g., timeflow 1) associated with the virtual database. Snapshots of the virtual database and changes to the virtual database (corresponding to changes in the associated source database) are captured and stored at a subset of time points (e.g., $T_0$, $T_1$, and $T_2$) along timeflow 1. In some embodiments, snapshots associated with the virtual database (corresponding to changes in the source database) and information corresponding to the timeflow are stored in a virtual database container (e.g., VDB container shown in FIG. 5b).

Responsive to a user request to rollback or rewind the VDB to a prior time point, as shown in FIG. 5b, in the second approach, the database storage system retains the same VDB with the same name and identifier within the same container, creates a new timeflow (e.g., timeflow 2, alternatively referred to herein as a 'current' timeflow) also within the same container and provisions the same VDB (e.g., VBD 1) from the new timeflow.

Toward this end, in some embodiments, the database storage system temporarily shuts down VDB 1 (e.g., suspends user access to VDB 1), creates a new timeflow within the same container (e.g., timeflow 2 within Container 1), points the destination storage to the new timeflow and brings up the same original VDB (e.g., VDB 1) provisioned from the new timeflow (e.g., from timeflow 2).

In other words, the database storage system mounts the same VDB files (e.g., files corresponding to VDB 1) at the same destination as prior to rollback, but pointed to a set of database blocks corresponding to the identified point in time. The container of the VDB includes a new timeflow (i.e., timeflow 2 rather than timeflow 1, which is made the 'current' timeflow), and tracks changes to the VDB (e.g., by capturing and maintaining VDB snapshots, such as snapshot 4 at time $T_3$ and snapshot 5 at time $T_4$, and transaction log files between snapshots) along the new timeflow (timeflow 2).

Figure 6:
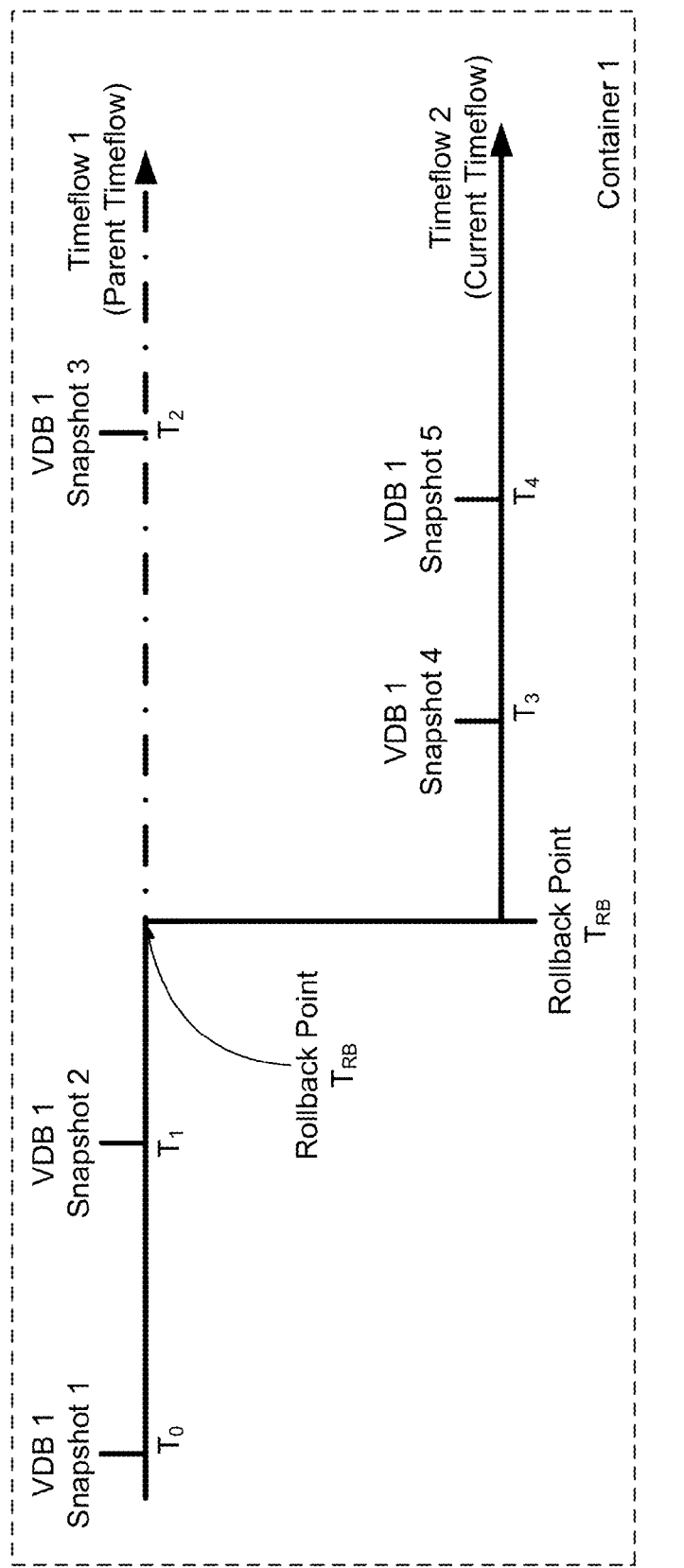
FIG. 6 illustrates user visibility of timeflows in the instance of a virtual database rollback (or rewind), according to some embodiments.

FIG. 6 illustrates user visibility of timeflows (e.g., in the graphical user interface) in the instance of a virtual database rollback (or rewind), according to some embodiments. With reference to the second approach to rewinding a VDB (e.g., as described above with reference to FIG. 5b), in some embodiments, at least a portion of the old or parent timeflow (e.g., timeflow 1 as shown in FIG. 5b and FIG. 6) is made invisible to the user in the graphical user interface. Specifically, the portion of the old or parent timeflow subsequent to the rollback point is made invisible to the user. For example, referring to FIG. 6, the portion of the parent timeflow (e.g., timeflow 1) after $T_{RB}$ is made invisible to the user in the graphical user interface. As a result, in some embodiments, transaction log files and snapshots of the VDB captured after the rollback point on the parent timeflow (e.g., snapshot 3 captured at time $T_2$ along timeflow 1) are hidden or concealed from the user. In other embodiments, all timeflows associated with a VDB are provided to the user and the user is allowed to modify the state of the VDB to any state along any of the timeflows.

On the other hand, the new timeflow (e.g., timeflow 2 as shown in FIG. 6) is designated as the 'current' timeflow. Modifications and updates to the VDB (e.g., on account of changes to database blocks of the source database) occurring after the rollback point are saved in the same container (e.g., Container 1) along the new or current timeflow (e.g., snapshot 4 captured at time $T_3$, snapshot 5 captured at time $T_4$, and transaction log files describing changes between the snapshots).

Shared ancestor changes on the parent timeflow (e.g., changes or updates on the parent timeflow prior to the rollback point) are visible to the user, and optionally appear to be part of the current timeflow. For example, changes or updates made to the VDB along the parent timeflow prior to the rollback point captured as VDB snapshots and transaction log files prior to the rollback point (e.g., snapshot 1 at time $T_0$ and snapshot 2 at time $T_1$) are visible to the user.

Figure 7:
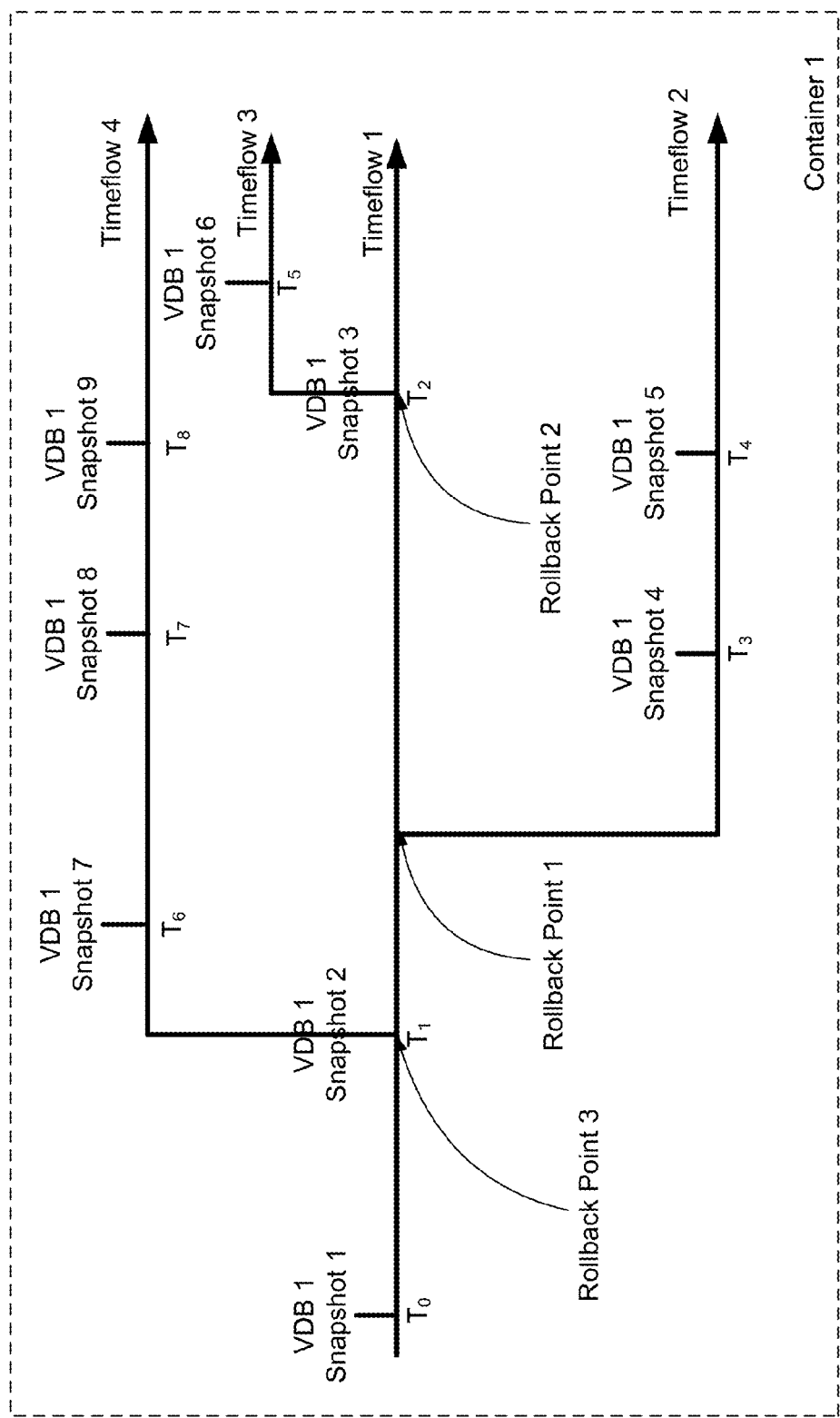
FIG. 7 illustrates a process of moving a virtual database backward (e.g., rolling back or rewinding) and forward (fast forwarding) along a timeflow, according to some embodiments.

FIG. 7 illustrates a process of moving a virtual database backward (e.g., rolling back or rewinding) and forward (e.g., fast forwarding) along a current or previous timeflow, according to some embodiments. In some embodiments, the second approach to rewinding a virtual database (e.g., as explained with reference to FIG. 5b) is additionally beneficial for enabling a user to move backward—as well as forward—to any time point along a current or previous timeflow in a storage and time efficient manner. As a special case, in some embodiments, the user is allowed to efficiently undo a prior VDB rewind by moving the VDB to a respective time point shortly prior to performing the rewind, but starting a new timeflow at the respective timeflow.

Accordingly, to enable the user to efficiently move back and forward along the VDB to any time point along a current or prior timeflow, the database storage system stores and saves all timeflows (current and prior) as well as all snapshots and transaction log files (of VDB updates and modifications between snapshots) associated with the VDB (e.g., in the same container). Consequently, the database storage system permits the user to rollback or move forward the VDB to any time point along any of the saved timeflows (e.g., by accessing snapshots and, optionally, transaction log files stored in the container, as described with reference to FIG. 4b and FIG. 5b).

For example, as illustrated in FIG. 7, timeflow 1 records a history of continuous changes and updates to VDB 1 over time. Snapshot 1, snapshot 2, and snapshot 3 are captured at time points (e.g., time $T_0$, time $T_1$, and time $T_2$) along timeflow 1.

At a point in time after time $T_2$ along timeflow 1, responsive to a user request to rollback VDB 1 to rollback point 1 along timeflow 1, the database storage system obtains a representation of VDB 1 at rollback point 1 (e.g., as described with reference to FIG. 5b) and creates a new timeflow (timeflow 2) originating at rollback point 1. Database storage system tracks changes and updates to VDB 1 subsequent to rollback point 1 along timeflow 2. Accordingly, snapshot 4 and snapshot 5 are captured at time points (e.g., time $T_3$ and time $T_4$) along timeflow 2. Container 1 stores and saves the previous timeflow (e.g., timeflow 1) and associated snapshots (e.g., snapshot 1, snapshot 2, and snapshot 3 are captured along timeflow 1) and transaction logs.

Similarly, responsive to a user request to rollback to rollback point 2, database storage system creates a new timeflow (timeflow 3) and stores and saves changes and updates to VDB 1 (along with snapshots and transaction logs) along timeflow 3 (originating at rollback point 2). Database storage system 100 stores the current and prior timeflows, snapshots, transaction logs in container 1.

Further, along similar lines, responsive to a user request to rollback VDB 1 to rollback point 3, database storage system 100 creates a new timeflow (timeflow 4) and stores further changes and updates to VDB 1 (along with snapshots and transaction logs) along timeflow 4 (originating at rollback point 3). Database storage system stores the current and prior timeflows (timeflow 1, timeflow 2, timeflow 3, and timeflow 4), snapshots, and transaction logs in container 1.

Although FIG. 7 illustrates rollback of a VDB to rollback points along timeflow 1, in practice, database storage system is configured to rollback the VDB to one or more rollback points along any previous or current timeflows (e.g., timeflow 1, timeflow 2, timeflow 3, and timeflow 4) stored in the container.

Figure 8:
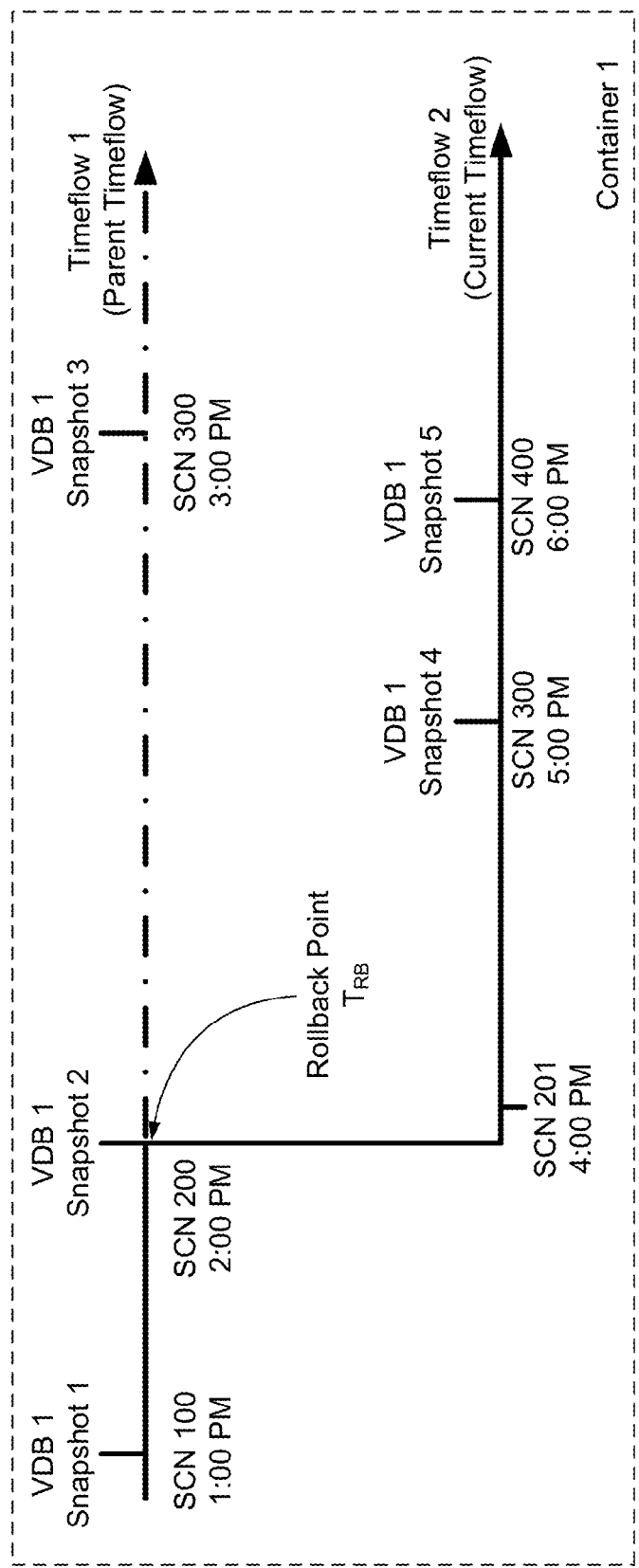
FIG. 8 illustrates changes in a real-time clock and sequence change numbers (SCNs) at a time of virtual database rollback, according to some embodiments.

FIG. 8 illustrates changes in a real-time clock and system change numbers (SCNs) at a time of virtual database rollback, according to some embodiments. In some embodiments, the database storage system 100 maintains a counter or system change numbers (SCNs) to keep track of changes or updates to the VDB over a timeflow. Accordingly, system change numbers are incremented along a timeflow progression. Similarly, in some embodiments, real-time values corresponding to time of changes or updates to the VDB are concurrently recorded and saved along with the SCNs for the changes or updates. For example, as shown in FIG. 8, along timeflow 1, system change numbers (SCNs) increase or are incremented from SCN 100 (corresponding to snapshot 1) at real-time 1 PM, to SCN 200 (corresponding to snapshot 2) at real-time 2 PM, to SCN 300 (corresponding to snapshot 3) at real-time 3 PM.

At the point of VDB rollback, database storage system 100 creates a new timeflow that originates at the rollback point; database storage system resets (e.g., decrements relative to a current value or the value immediately prior to the rollback) the system change number (SCN) to a value marginally greater than its value at the rollback point (e.g., to the next higher integer value). In some embodiments, the SCN value and the real-time values corresponding to time of changes or updates to the VDB are continually incremented and do not reset at the point of VDB rollback.

For example, in the illustration shown in FIG. 8, referring to timeflow 1 or the parent timeflow, the SCN has a value of 300 prior to rollback, at real-time 3:00 PM. Shortly after rollback of the VDB to rollback point $T_{RB}$, upon creation of the current timeflow (e.g., timeflow 2), the SCN value is decremented to a value of 201 (the next higher integer to 200, the SCN value at $T_{RB}$), but real-time continually increases (e.g., increases to 4:00 PM) and is not reset back. In some embodiments, transaction logs with the same system change numbers are distinguished by opening reset logs (e.g., thereby creating a new incarnation of the VDB).

Figure 9A:
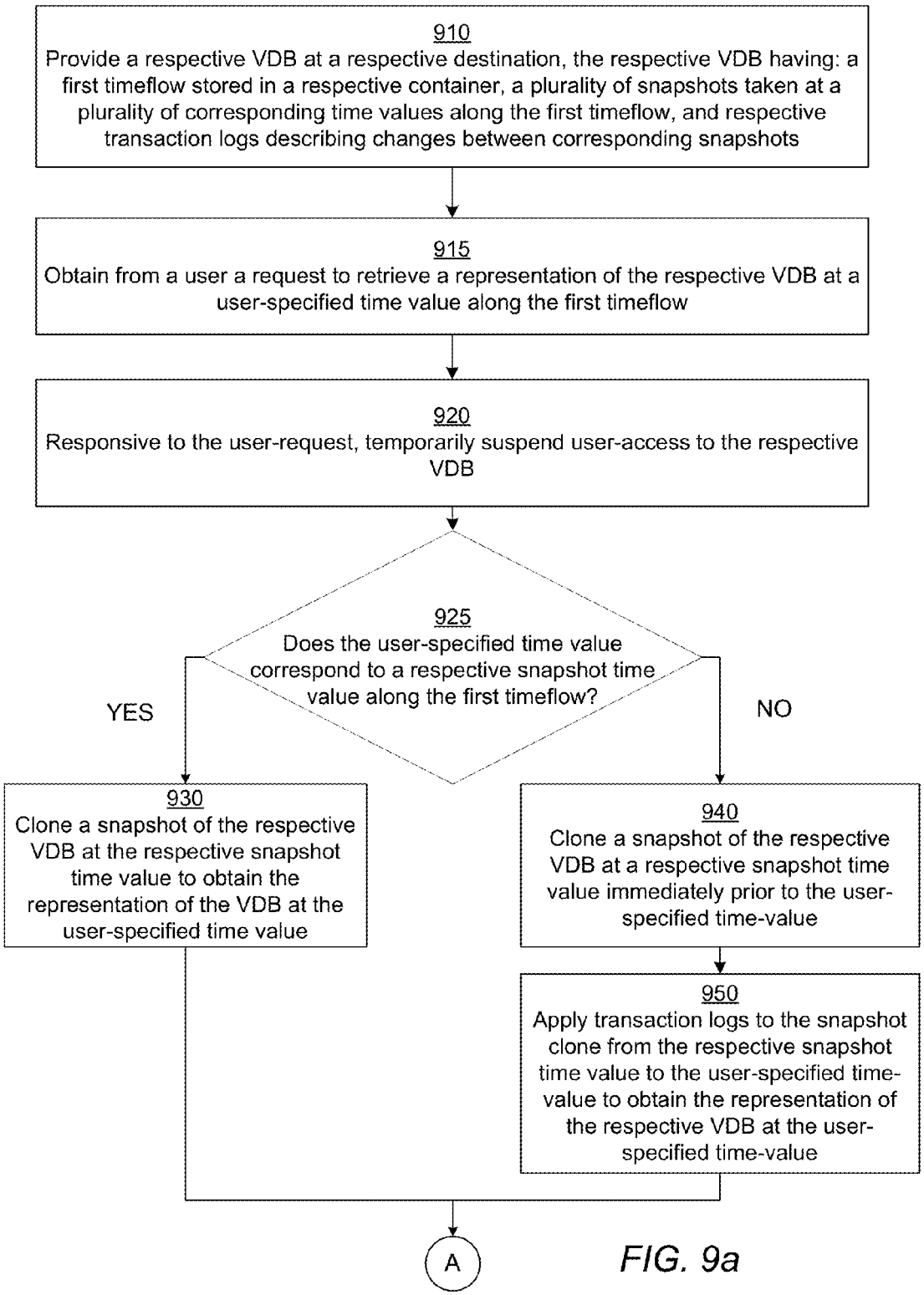
FIGS. 9a-9b include a flowchart of a process for rewinding or rolling back a virtual database, according to an embodiment of the invention.
Figure 9B:
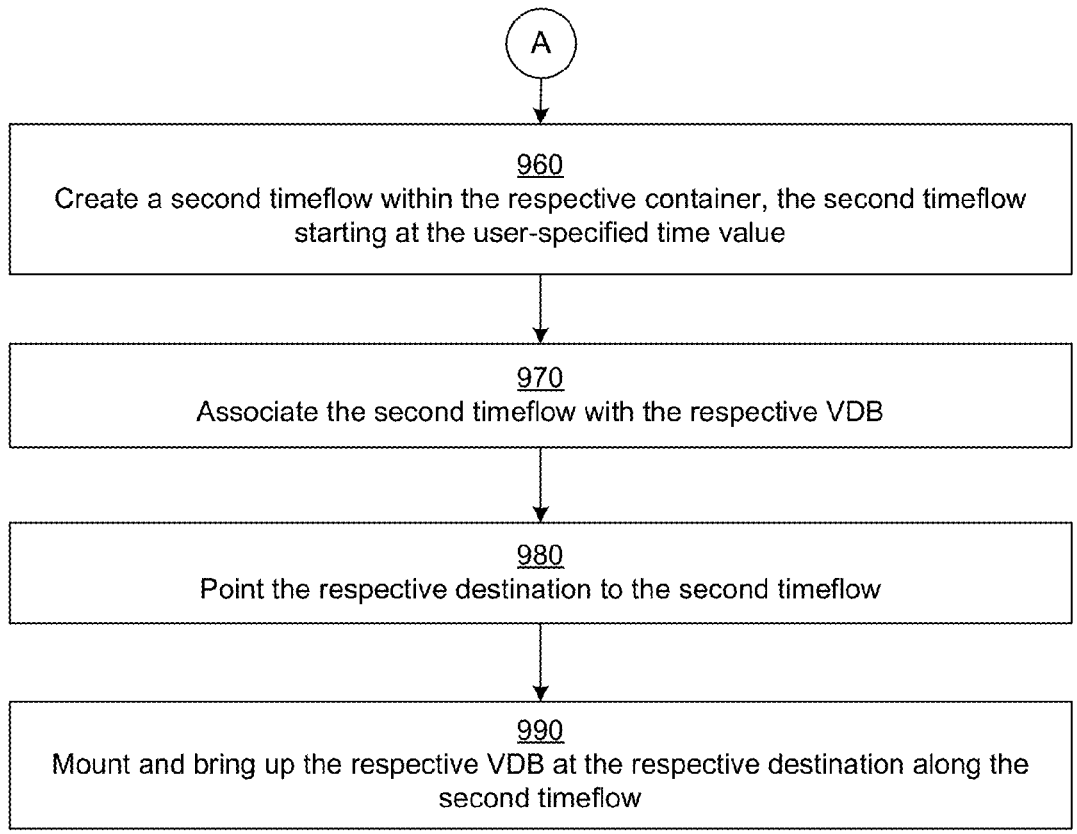

FIGS. 9a-9b show flowcharts of a process 900 for deleting database infrastructure objects in a database storage system according to an embodiment of the invention. As shown in FIG. 9a, the database storage system 100 provides (910) a virtual database (VDB) at a target server, the VDB having: a first timeflow (e.g., timeflow 1 shown in FIG. 5b) stored in a container (e.g., container 1 illustrated in FIG. 5b), a plurality of snapshots taken at a plurality of corresponding time values along the first timeflow (e.g., snapshot 1 at time $T_0$, snapshot 2 at time $T_1$, snapshot 3 at time $T_2$ as explained with reference to FIG. 5b), and respective transaction logs describing changes between corresponding snapshots (e.g., transaction logs 470-a between time $T_0$ and time $T_1$).

Database storage system 100 obtains (915) from a user a request to retrieve a representation of the respective VDB at a user-specified time value along the first timeflow (e.g., a representation of VDB 1 at Rollback time $T_{RB}$ along timeflow 1, as shown in FIG. 5b).

Responsive to the user-request, in some embodiments, database storage system 100 temporarily suspends (920) user-access to the respective VDB. Database storage system 100 makes a determination (925) as to whether the user-specified time value corresponds to a respective snapshot time value (i.e., a point in time at which a point-in-time copy was made) along the first timeflow.

Responsive to a determination that the user-specified time value corresponds to a respective snapshot time value along the first timeflow, database storage system 100 clones (930) a snapshot of the respective VDB at the respective snapshot time value (e.g., VDB 1 snapshot 2 at time $T_{RB}$, as shown in FIG. 8) to obtain the representation of the VDB at the user-specified time value. Responsive to a determination that the user-specified time value does not correspond to a respective snapshot time value along the first timeflow, database storage system 100 clones (940) a snapshot of the respective VDB at a respective snapshot time value immediately prior to the user-specified time-value (e.g., VDB 1 snapshot 2 at time T1 immediately prior to Rollback point $T_{RB}$, as shown in FIG. 5b). The database storage system 100 then applies (950) transaction logs to the snapshot clone from the respective snapshot time value to the user-specified time-value to obtain the representation of the data blocks for the VDB at the user-specified time-value (e.g., transaction logs between time T1 to Rollback point $T_{RB}$, as shown in FIG. 5b). This allows the database storage system 100 to obtain the representation of the VDB at the user-specified time value (e.g., at rollback point $T_{RB}$ shown in FIG. 5b).

Database storage system 100 creates (960) a second timeflow within the respective container (e.g., timeflow 2 within Container 1 as shown in FIG. 5b), the second timeflow starting at the user-specified time value (e.g., at time value $T_{RB}$ as illustrated in FIG. 5b). Database storage system 100 associates (970) the second timeflow with the respective VDB. Database storage system 100 points (980) the respective destination to the second timeflow. Database storage system 100 mounts (990) and brings up the respective VDB at the respective destination along the second timeflow.

FIGS. 10a-10g include examples of graphical user interfaces for retrieving virtual database snapshots, interacting with VDB timeflows, and performing virtual database rewind (or rollback) according to some embodiments.

Figure 10A:
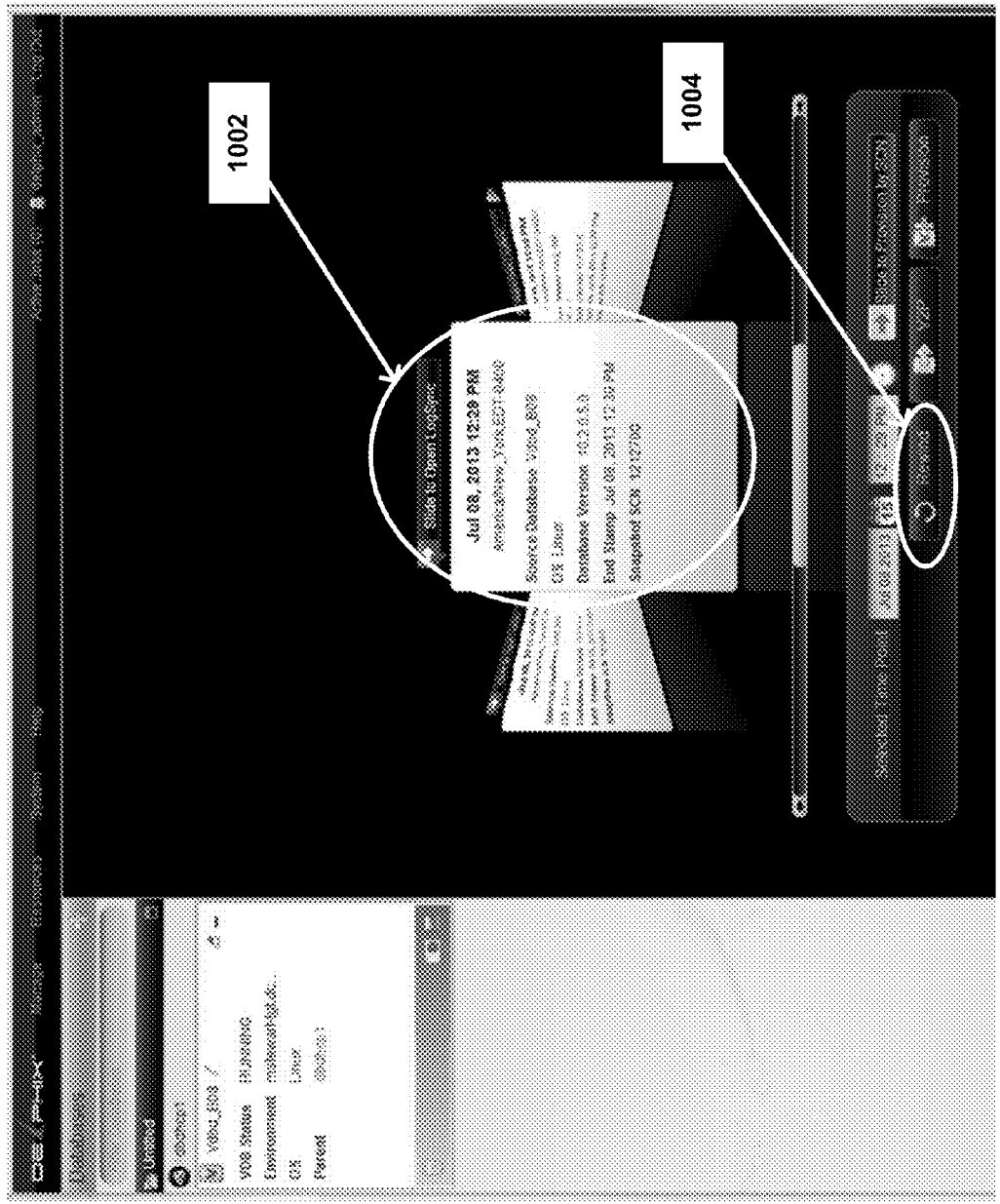
FIGS. 10a-10g include examples of graphical user interfaces for retrieving virtual database snapshots, interacting with VDB timeflows, and performing virtual database rewind (or rollback) according to some embodiments.

FIG. 10a illustrates an example of a graphical user interface including one or more snapshot cards 1002 (e.g., that each display a snapshot time and a system change number or SCN), according to some embodiments. The graphical user interface of FIG. 10a further includes a user interactive icon (e.g., a rewind button 1004) to enable or initiate VDB rewind or rollback, according to some embodiments.

Figure 10B:
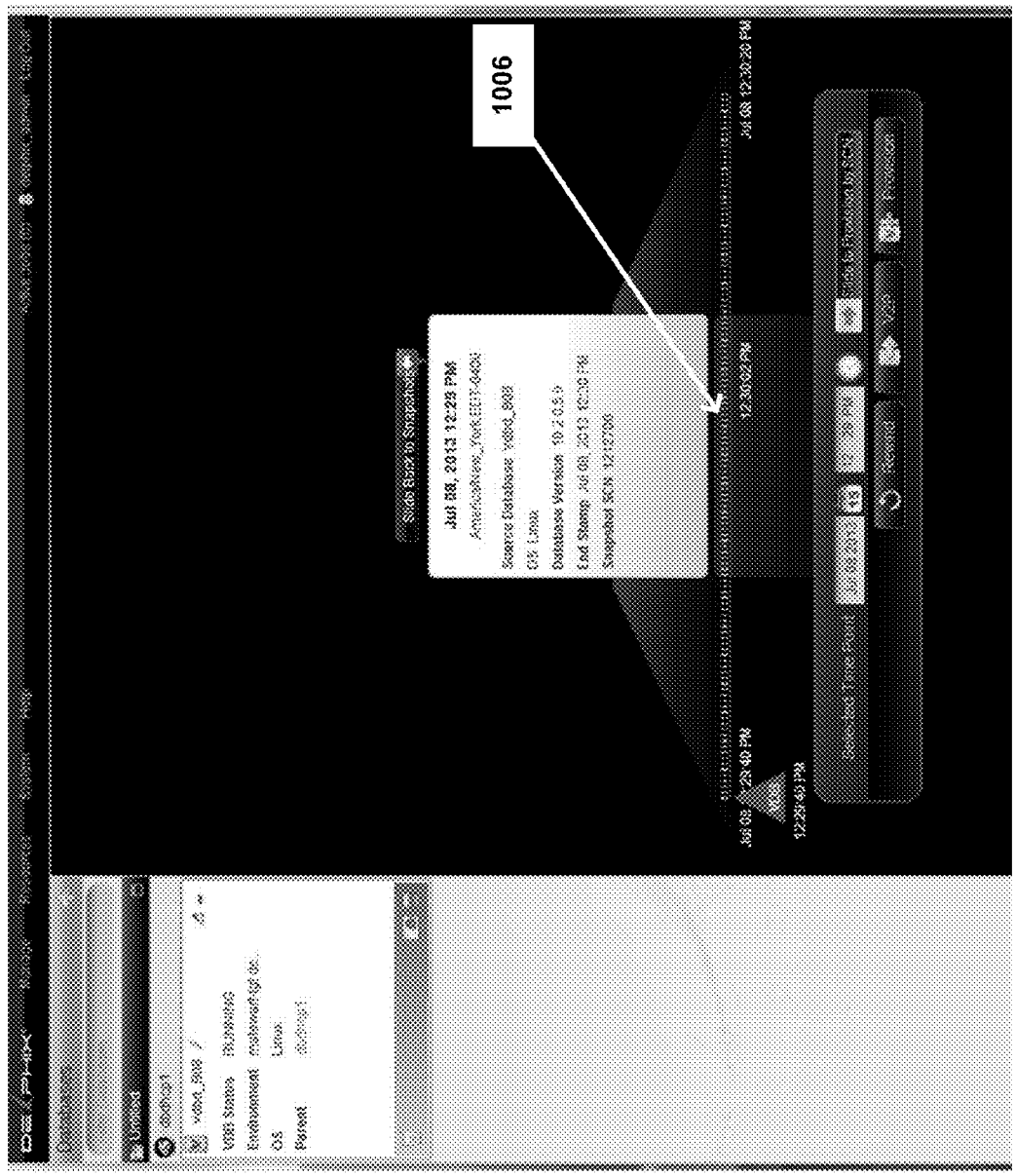

FIG. 10b illustrates an example of a graphical user interface including display of a timeline (1006) between snapshot cards, according to some embodiments. In some embodiments, multiple timelines may be displayed, one timeline corresponding to each timeflow of the VDB. The user can select any timeflow and a point-in-time of the timeflow to specify the state to which the user wants to rewind the VDB.

Figure 10C:
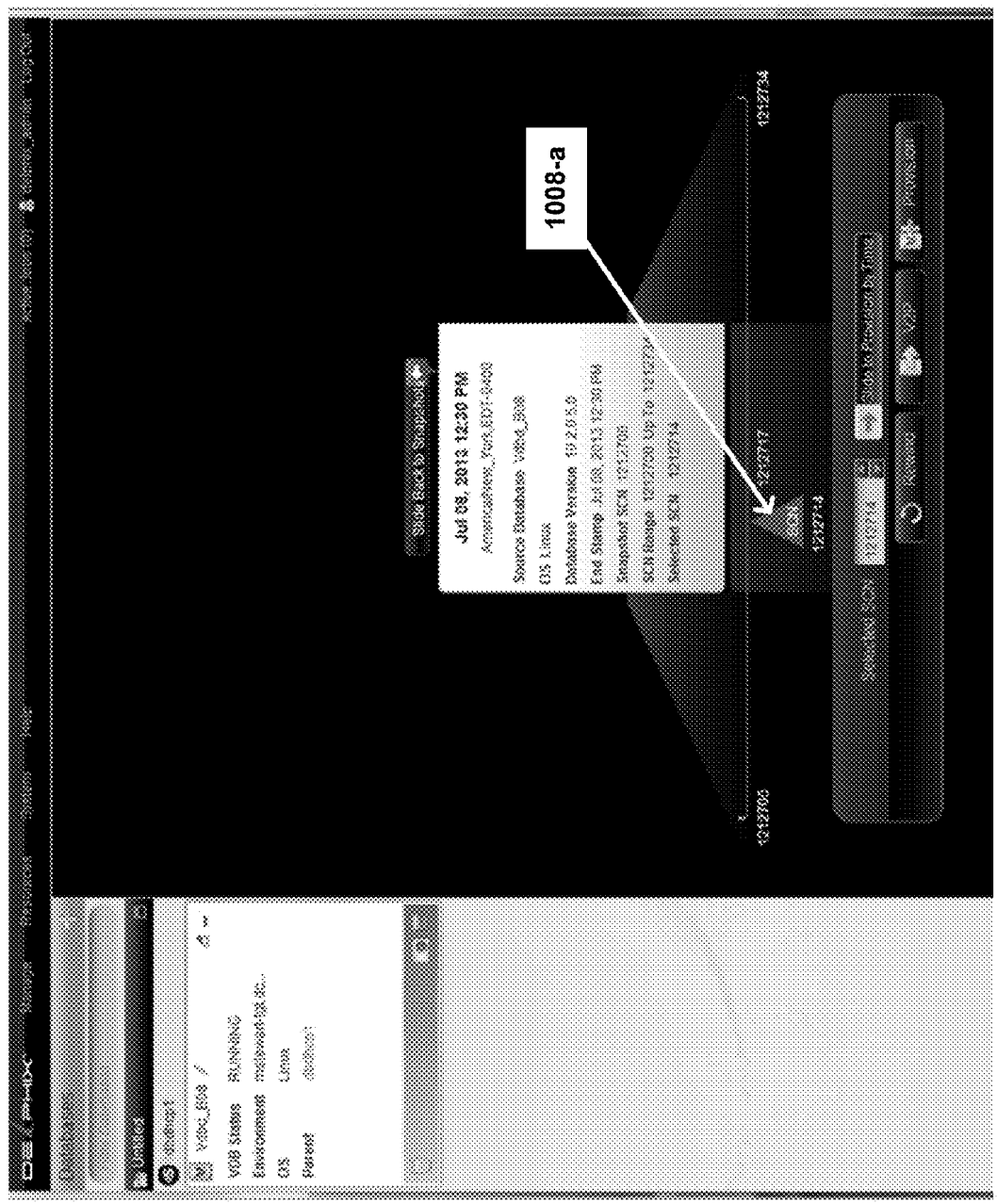
Figure 10D:
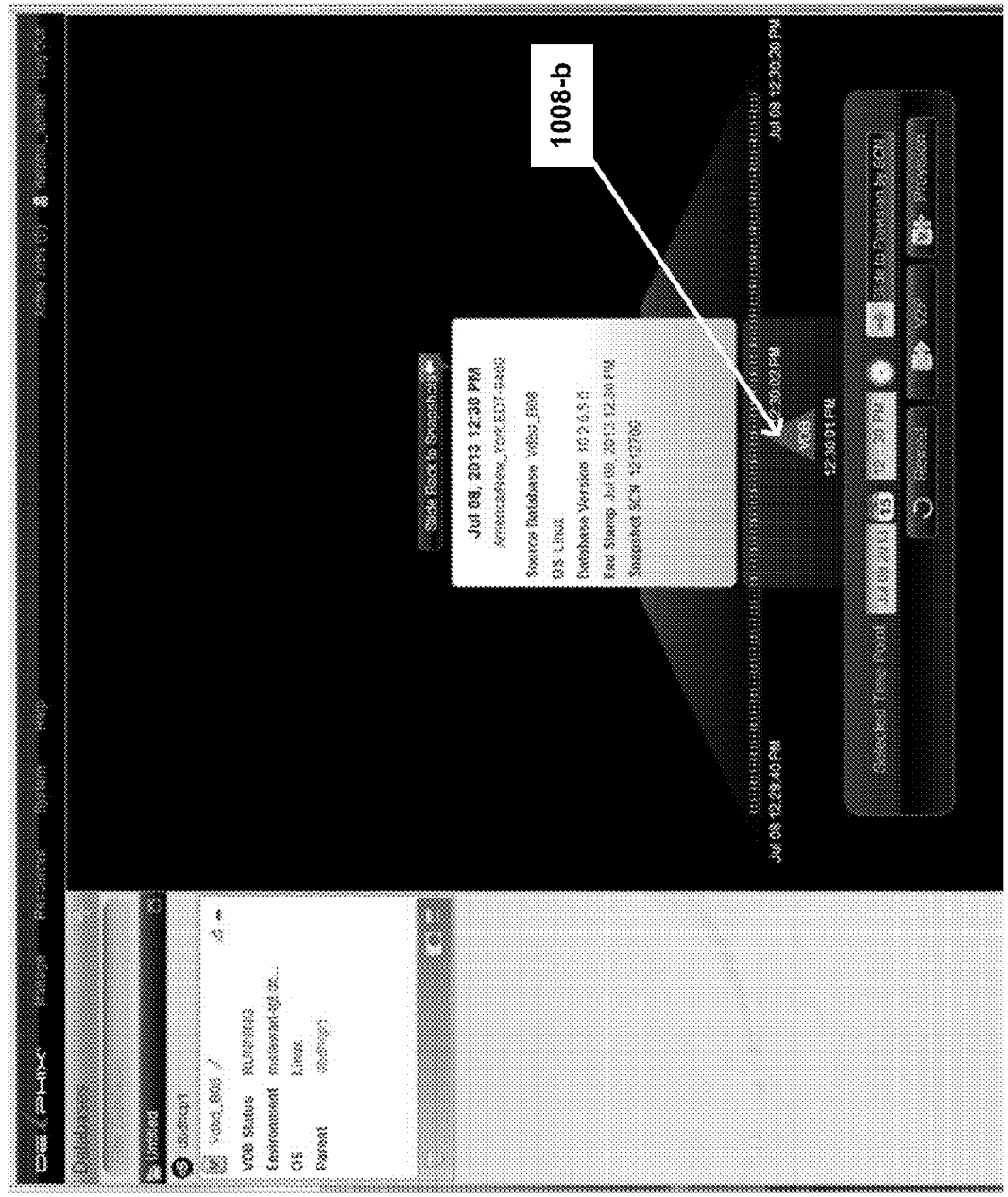

FIGS. 10c-10d illustrate examples of graphical user interfaces including user selected points between snapshot cards, selected based on system change numbers or SCNs (e.g., 1008-a, FIG. 10c) and based on a real-time value (e.g., 1008-b, FIG. 10d), according to some embodiments.

Figure 10E:
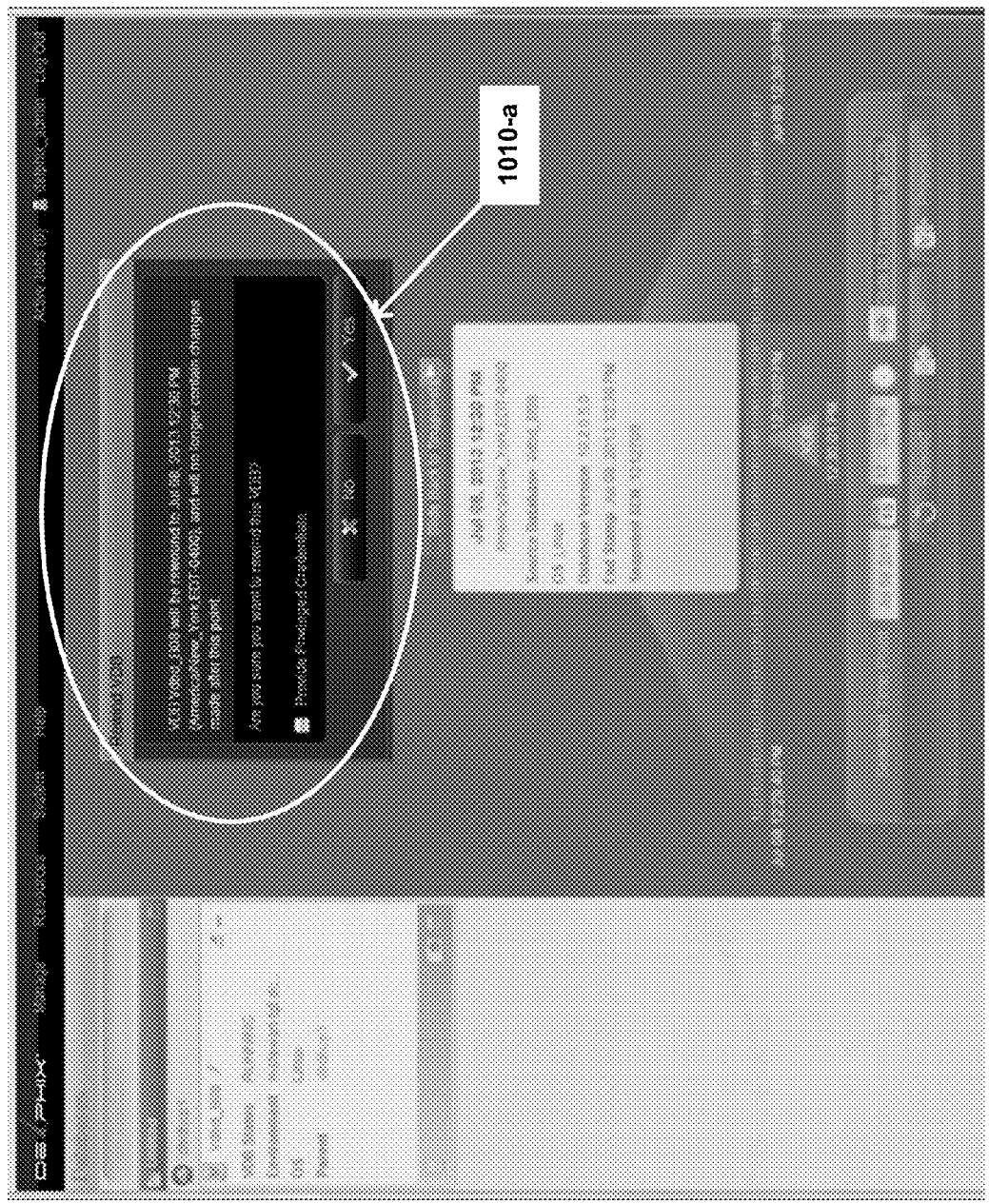
Figure 10F:
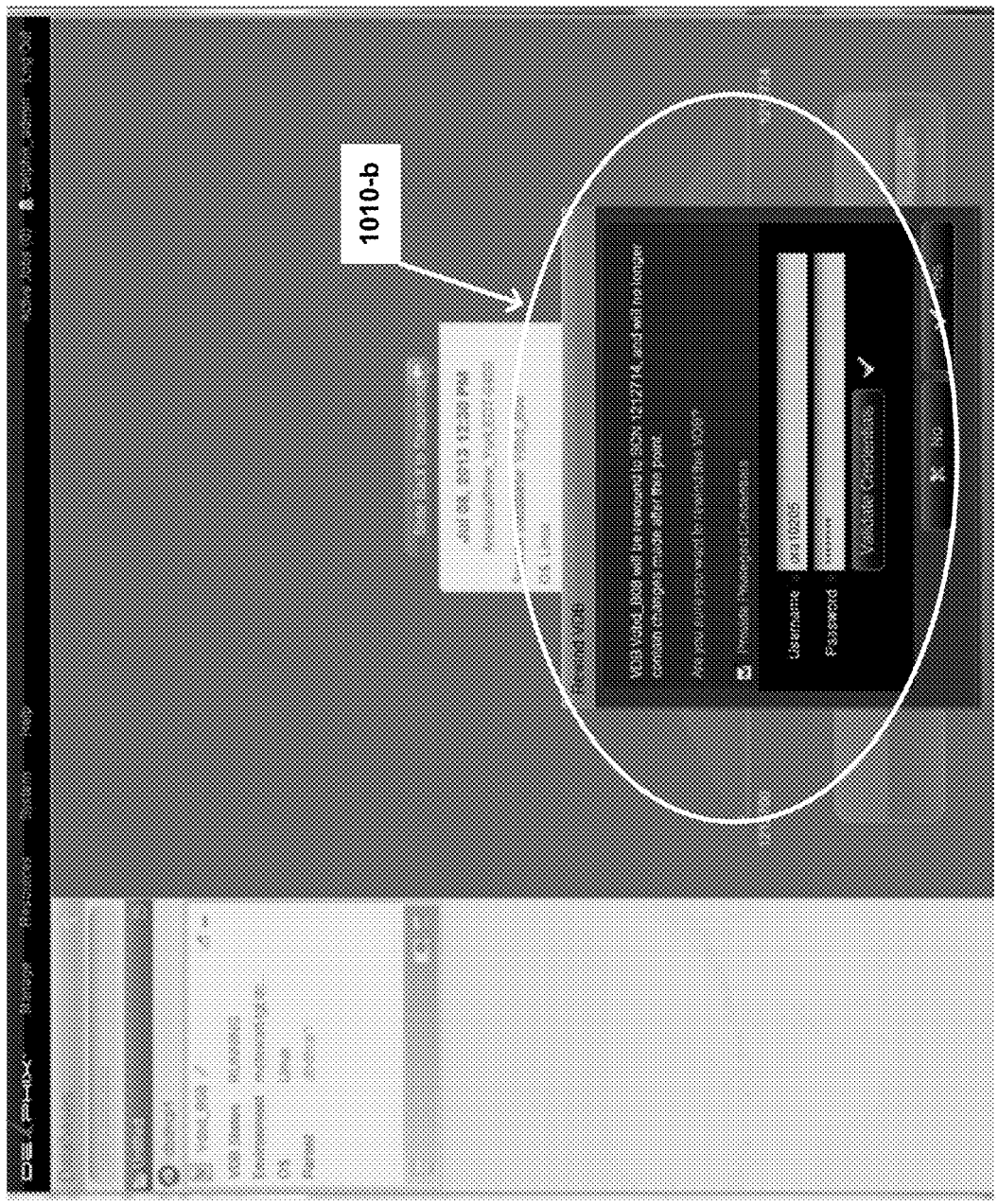
Figure 10G:
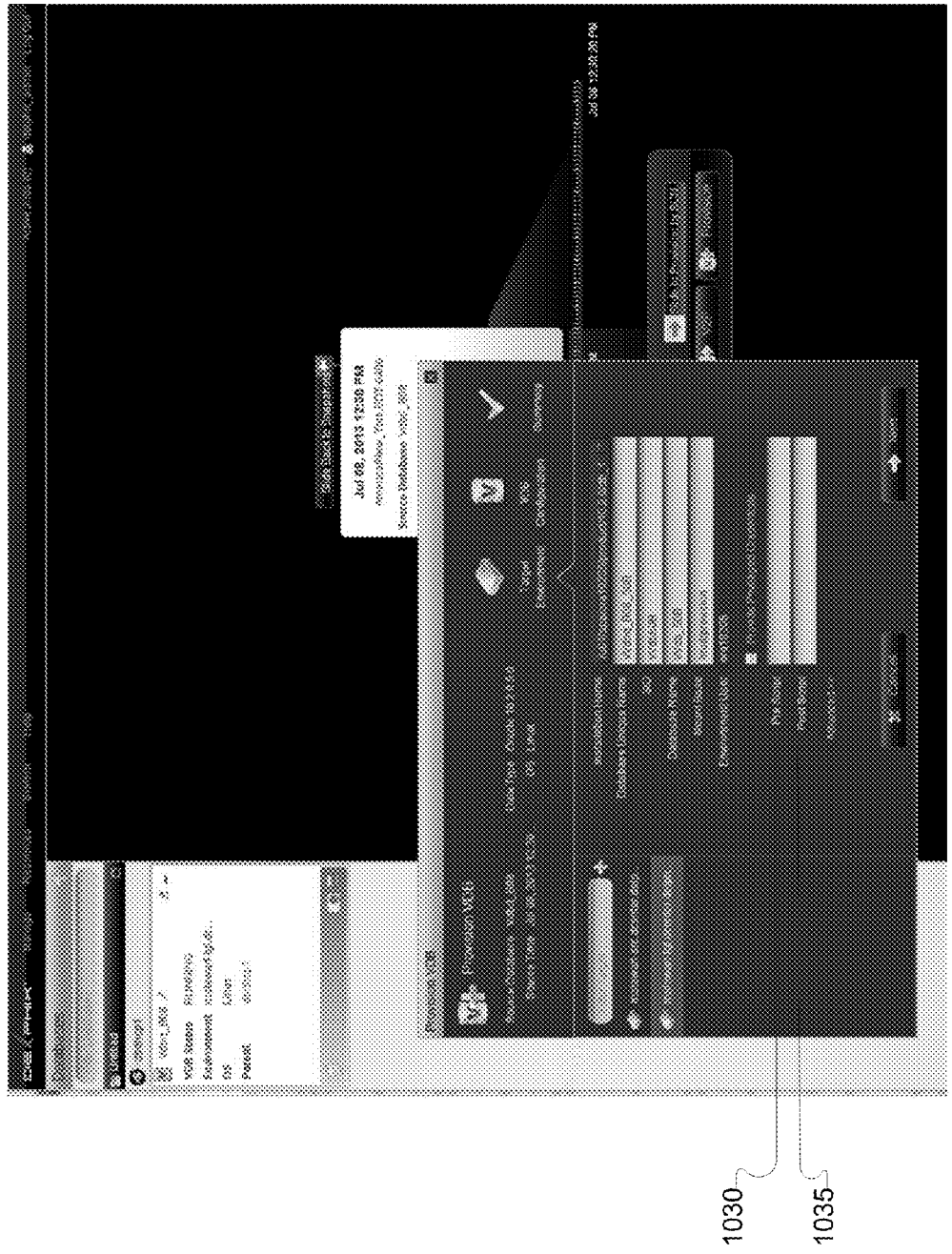

FIGS. 10e-10g illustrate examples of graphical user interfaces including interfaces (1010-a, FIG. 10e; 1010-b, FIG. 10f) displayed in response to a VDB rewind request, according to some embodiments. FIG. 10e shows a user interface requesting the user for a confirmation for the rewind operation. If the user selects "yes" on the confirmation screen, the database storage system 100 proceeds with the rewind operation. FIG. 10f shows a user interface illustrating that the database storage system 100 may require the user to provide credentials, for example, user name and password. This allows the database storage system 100 to verify if the user is authorized to perform the rewind or refresh operation. FIG. 10g shows a user interface that allows the user to make modifications to the VDB metadata, for example, to specify a prescript 1030 or a postscript 1035 to be executed before and after rewinding/refreshing the VDB. In an embodiment, the prescript may shutdown any processes of the target database server associated with the VDB and the postscript may restart the processes of the target database server.

User interfaces similar to those shown in FIGS. 10a-g are shown, allowing user to refresh a VDB based on a state of a source database. The source database itself can be a production database system 110 or another VDB. Accordingly, timeflows of the source database are displayed, allowing the VDB to be refreshed to a more recent point-in-time of the source database.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for rewinding a virtual database system, the method comprising:

storing, in a database storage system, a plurality of snapshots of a source database, a snapshot representing a point-in-time copy of database blocks of the source database, wherein one or more database blocks are shared across snapshots of the source database;

provisioning a virtual database based on database blocks of a snapshot of the source database;

maintaining, by the database storage system, one or more timeflows for the virtual database, each timeflow representing changes to the virtual database starting from an initial state of the virtual database, the representation of changes comprising snapshots of the virtual database taken at different points in time, wherein one or more database blocks are shared across a plurality of snapshots of the virtual database;

receiving a request to rewind the virtual database to a previous state of the virtual database, the request identifying a timeflow of the virtual database and a target point in time associated with the identified timeflow, rewinding the virtual database by modifying the virtual database to refer to database blocks of a snapshot of the virtual database associated with the timeflow, the snapshot of the virtual database saved before or at the target point in time; and maintaining a new timeflow for the rewound virtual database, the new timeflow comprising representations of changes caused by subsequent updates to the rewound virtual database.

2. The computer-implemented method of claim 1, wherein the previous state is a first state, the request to modify is the first request to modify, the target timeflow is a first timeflow, the point in time is a first point in time, the snapshot of the virtual database is the first snapshot, the method further comprising:

receiving a second request to further rewind the virtual database to a second state of the virtual database, the second state associated with a second target point in time of a second timeflow of the virtual database, rewinding the virtual database again by modifying the virtual database to refer to database blocks of a second snapshot of the virtual database associated with the second timeflow, the second snapshot saved before or at the second target point in time.

3. The computer-implemented method of claim 1, the method further comprising:

sending a request to shut down a process associated with the virtual database before rewinding the virtual database; and sending a request to restart the process after rewinding the virtual database.

4. The computer-implemented method of claim 1, wherein a timeflow of the virtual database comprises a first snapshot and a second snapshot, wherein the second snapshot shares a database block with the first snapshot if the database block is not modified between the point in time that the first snapshot was saved and the point in time that the second snapshot was saved.

5. The computer-implemented method of claim 1, further comprising:
receiving a request to update data of a database block of a latest snapshot of a current timeflow of the virtual database; and
responsive to receiving the request to update the data, making a copy of the database block and updating the copy of the database block.

6. The computer-implemented method of claim 1, wherein the representation of changes of a time flow comprises transaction logs representing updates to the virtual database between two snapshots, the method further comprising:
responsive to modifying the virtual database to refer to database blocks of the snapshot of the virtual database, applying one or more transaction logs to the modified virtual database to update the state of the modified virtual database to correspond to the target point in time.

7. The computer-implemented method of claim 1, wherein the request to rewind the state of the virtual database to the previous state of the virtual database identifies the previous state by specifying a system change number of an update performed by the virtual database, the update associated with the identified timeflow.

8. The computer-implemented method of claim 1, wherein the request to rewind the state of the virtual database to the previous state of the virtual database identifies the previous state by specifying a time value associated with the identified timeflow of the virtual database.

9. The computer-implemented method of claim 1, wherein the virtual database is associated with a plurality of timeflows and wherein receiving the request to modify the state of the virtual database to the previous state of the virtual database identifies a timeflow from the plurality of timeflows.

10. The computer-implemented method of claim 1, wherein one or more database blocks of the virtual database are shared with one or more other virtual databases provisioned by the database storage system.

11. A computer-implemented method for refreshing a virtual database system to a state of a source database system, the method comprising:
maintaining, by a database storage system, one or more timeflows for a source database, each timeflow comprising representations of changes to the source database starting from an initial state of the source database, the representations comprising snapshots of the source database taken at different points in time, wherein one or more database blocks are shared across a plurality of snapshots of the source database;
provisioning, by the database storage system, a virtual database based on database blocks of a snapshot of the source database;
maintaining one or more timeflows for the virtual database, each timeflow comprising representations of changes to the virtual database starting from an initial state of the virtual database, the representations of changes comprising snapshots of the virtual database taken at different points in time, wherein one or more database blocks are shared across a plurality of snapshots of the virtual database;
receiving a request to refresh the virtual database to a state of the source database, the request identifying a timeflow of the source database and a target point in time of the timeflow;
refreshing the virtual database, comprising, modifying the virtual database to refer to database blocks of a snapshot of the source database associated with the timeflow, the snapshot saved before or at the target point in time; and
maintaining a new timeflow for the refreshed virtual database, the new timeflow comprising representations of changes caused by subsequent updates to the refreshed virtual database.

12. The computer-implemented method of claim 11, the method further comprising:
sending a request to shut down a process associated with the virtual database before refreshing the virtual database; and
sending a request to restart the process after refreshing the virtual database.

13. The computer-implemented method of claim 11, wherein a timeflow of the virtual database comprises a first snapshot and a second snapshot, wherein the second snapshot shares a database block with the first snapshot if the database block is not modified between the point in time that the first snapshot was saved and the point in time that the second snapshot was saved.

14. The computer-implemented method of claim 11, further comprising:
receiving a request to update data of a database block of a latest snapshot of a current timeflow of the virtual database; and
responsive to receiving the request to update the data, making a copy of the database block and updating the copy of the database block.

15. The computer-implemented method of claim 11, wherein the representation of changes of a time flow comprises transaction logs representing updates to the virtual database between two snapshots, the method further comprising:
responsive to modifying the virtual database to refer to database blocks of the snapshot of the virtual database, applying one or more transaction logs to the modified virtual database to update the state of the modified virtual database to correspond to the target point in time.

16. The computer-implemented method of claim 11, wherein the request to refresh the virtual database identifies the state of the source database by specifying a system change number of an update performed by the source database, the update associated with the identified timeflow.

17. The computer-implemented method of claim 11, wherein the request to refresh the virtual database identifies the state of the source database by specifying a time value associated with the identified timeflow of the source database.

18. The computer-implemented method of claim 11, wherein the source database is a virtual database associated with a plurality of timeflows and wherein receiving the request to refresh the virtual database identifies a timeflow from the plurality of timeflows.

19. The computer-implemented method of claim 11, wherein the source database is a production database stored in an external system different from the source database system.

20. A non-transitory computer readable storage medium storing instructions for:
storing, in a database storage system, a plurality of snapshots of a source database, a snapshot representing a point-in-time copy of database blocks of the source database, wherein one or more database blocks are shared across snapshots of the source database;
provisioning a virtual database based on database blocks of a snapshot of the source database;

maintaining, by the database storage system, one or more timeflows for the virtual database, each timeflow representing changes to the virtual database starting from an initial state of the virtual database, the representation of changes comprising snapshots of the virtual database taken at different points in time, wherein one or more database blocks are shared across a plurality of snapshots of the virtual database;

receiving a request to rewind the virtual database to a previous state of the virtual database, the request identifying a timeflow of the virtual database and a target point in time associated with the identified timeflow, rewinding the virtual database by modifying the virtual database to refer to database blocks of a snapshot of the virtual database associated with the timeflow, the snapshot of the virtual database saved before or at the target point in time; and maintaining a new timeflow for the rewound virtual database, the new timeflow comprising representations of changes caused by subsequent updates to the rewound virtual database.

\* \* \* \* \*